United States Patent
McFadden et al.

(10) Patent No.: US 10,040,403 B2
(45) Date of Patent: Aug. 7, 2018

(54) CROSSBAR CLAMP ACTUATOR

(71) Applicant: Yakima Products, Inc., Lake Oswego, OR (US)

(72) Inventors: Scott A. McFadden, Portland, OR (US); Charles Kraeuter, Portland, OR (US); John Mark Elliott, Beaverton, OR (US); Gian-Marco D'Angelo, Portland, OR (US)

(73) Assignee: Yakima Products, Inc., Lake Oswego, OR (US)

( * ) Notice: Subject to any disclaimer, the term of this patent is extended or adjusted under 35 U.S.C. 154(b) by 87 days.

(21) Appl. No.: 15/167,774

(22) Filed: May 27, 2016

(65) Prior Publication Data

US 2016/0362057 A1 Dec. 15, 2016

Related U.S. Application Data

(60) Provisional application No. 62/173,333, filed on Jun. 9, 2015, provisional application No. 62/175,192, filed on Jun. 12, 2015.

(51) Int. Cl.
| | |
|---|---|
| *B60R 9/052* | (2006.01) |
| *B60R 9/058* | (2006.01) |
| *B60R 9/05* | (2006.01) |
| *B60R 11/00* | (2006.01) |

(52) U.S. Cl.
CPC ............. *B60R 9/058* (2013.01); *B60R 9/05* (2013.01); *B60R 9/052* (2013.01); *B60R 2011/0059* (2013.01)

(58) Field of Classification Search
CPC ........... B60R 9/04; B60R 9/052; B60R 9/058; B60R 9/048; B60R 9/10; B60R 9/05; B60R 2011/0059

USPC ........ 224/316–317, 319, 322–326, 329–330; 248/412, 222.13, 229.11, 229.21, 228.2, 248/230.2, 231.31, 316.2; 254/104

See application file for complete search history.

(56) References Cited

U.S. PATENT DOCUMENTS

| | | |
|---|---|---|
| 488,395 A | 12/1892 | Justice |
| 529,827 A | 11/1894 | Fonda |
| 556,789 A | 3/1896 | Walker |

(Continued)

FOREIGN PATENT DOCUMENTS

| | | |
|---|---|---|
| AU | 2003231667 A1 | 2/2004 |
| AU | 2006100386 A4 | 6/2006 |

(Continued)

OTHER PUBLICATIONS

Yakima Car Racks, Wing Bars and Locking RailRiders, 1997 Catalog, p. 9.

(Continued)

*Primary Examiner* — Scott McNurlen
(74) *Attorney, Agent, or Firm* — Kolisch Hartwell, P.C.

(57) ABSTRACT

A crossbar clamp actuator of a crossbar-to-vehicle coupler may include a horizontally traveling wedge block having a ramped, downward-facing first slide surface, and a wedge follower having a second slide surface in frictional contact with the first slide surface of the traveling wedge block. Substantially horizontal repositioning of the traveling wedge block may cause the ramped first slide surface to urge the wedge follower downward, thereby actuating a crossbar clamp.

20 Claims, 10 Drawing Sheets

(56) References Cited

U.S. PATENT DOCUMENTS

| | | |
|---|---|---|
| 576,351 A | 2/1897 | Penfield |
| 586,681 A | 7/1897 | Douglas |
| 607,024 A | 7/1898 | Durfee et al. |
| 614,264 A | 11/1898 | Fletcher |
| 615,264 A | 12/1898 | Du Pont |
| 1,179,823 A | 4/1916 | Greene |
| 1,789,458 A | 1/1931 | Bureau |
| 2,206,328 A | 7/1940 | Martinek |
| 2,248,170 A | 7/1941 | Hansen |
| 2,302,300 A | 11/1942 | Davies |
| 2,317,195 A | 4/1943 | Husted |
| 2,415,286 A | 2/1947 | Hyde |
| 2,431,400 A | 11/1947 | Iverson |
| 2,536,797 A | 1/1951 | Cooke |
| 2,551,218 A | 5/1951 | Menne |
| 2,573,187 A | 10/1951 | Désilets |
| 2,584,283 A | 2/1952 | Oliver et al. |
| 2,613,020 A | 10/1952 | Berry |
| 2,696,231 A | 12/1954 | Pardo |
| 2,723,005 A | 11/1955 | Wink |
| 2,729,499 A | 1/1956 | Eggum |
| 2,816,672 A | 12/1957 | Facchini |
| 2,988,253 A | 6/1961 | Menghi |
| 3,001,679 A | 9/1961 | Canning et al. |
| 3,042,240 A | 7/1962 | Cline |
| 3,064,868 A | 11/1962 | Treydte |
| 3,113,642 A | 12/1963 | Lay |
| 3,116,836 A | 1/1964 | McCauley |
| 3,155,249 A | 11/1964 | Johnson |
| 3,186,569 A | 6/1965 | Roux |
| 3,190,587 A | 6/1965 | Fries |
| 3,221,960 A | 12/1965 | Gleason et al. |
| 3,239,115 A | 3/1966 | Bott et al. |
| 3,240,406 A | 3/1966 | Logan |
| 3,276,085 A | 10/1966 | Spranger |
| 3,300,171 A | 1/1967 | Walls |
| 3,378,182 A | 4/1968 | McMiller |
| RE26,538 E | 3/1969 | Bott |
| RE26,539 E | 3/1969 | Bott |
| 3,430,983 A | 3/1969 | Jones |
| 3,460,694 A | 8/1969 | Simms |
| 3,469,810 A | 9/1969 | Dorris |
| 3,519,180 A | 7/1970 | Bott |
| 3,529,737 A | 9/1970 | Daugherty |
| 3,554,416 A | 1/1971 | Bott |
| 3,581,962 A | 6/1971 | Osborn |
| 3,596,788 A | 8/1971 | Willie |
| 3,606,432 A | 9/1971 | Honatzis |
| 3,615,069 A | 10/1971 | Bott |
| 3,642,157 A | 2/1972 | Williams, Jr. |
| 3,643,973 A | 2/1972 | Bott |
| 3,677,195 A | 7/1972 | Prete, Jr. |
| 3,677,451 A | 7/1972 | Burland |
| 3,737,083 A | 6/1973 | Lund |
| 3,740,034 A | 6/1973 | Scroggins |
| 3,744,689 A | 7/1973 | Kjensmo |
| 3,777,922 A | 12/1973 | Kirchmeyer |
| 3,826,390 A | 7/1974 | Watson |
| 3,828,993 A | 8/1974 | Carter |
| 3,843,001 A | 10/1974 | Willis |
| 3,848,784 A | 11/1974 | Shimano et al. |
| 3,848,785 A | 11/1974 | Bott |
| 3,858,774 A | 1/1975 | Friis |
| 3,861,533 A | 1/1975 | Radek |
| 3,892,455 A | 7/1975 | Sotolongo |
| D238,771 S | 2/1976 | Spokus, Sr. |
| 3,946,917 A | 3/1976 | Crawford et al. |
| 3,951,320 A | 4/1976 | Bott |
| 3,976,213 A | 8/1976 | Ball |
| 3,993,167 A | 11/1976 | Reed |
| 4,015,760 A | 4/1977 | Bott |
| 4,022,362 A | 5/1977 | Revercomb |
| 4,023,761 A | 5/1977 | Molis |
| 4,034,879 A | 7/1977 | Cudmore |
| 4,046,297 A | 9/1977 | Bland |
| 4,050,616 A | 9/1977 | Mosow |
| 4,055,284 A | 10/1977 | Bott |
| 4,058,243 A | 11/1977 | Tappan |
| 4,081,118 A | 3/1978 | Mason |
| 4,085,763 A | 4/1978 | Thomas |
| 4,089,448 A | 5/1978 | Traeger |
| 4,099,658 A | 7/1978 | Bott |
| 4,106,680 A | 8/1978 | Bott |
| 4,114,409 A | 9/1978 | Scire |
| 4,126,228 A | 11/1978 | Bala et al. |
| 4,132,335 A | 1/1979 | Ingram |
| 4,156,497 A | 5/1979 | Bott |
| 4,162,755 A | 7/1979 | Bott |
| 4,165,827 A | 8/1979 | Bott |
| 4,170,322 A | 10/1979 | Bott |
| 4,171,077 A | 10/1979 | Richard, Jr. |
| 4,174,794 A | 11/1979 | Bott |
| 4,175,682 A | 11/1979 | Bott |
| 4,182,471 A | 1/1980 | Bott |
| 4,213,593 A | 7/1980 | Weik |
| 4,213,729 A | 7/1980 | Cowles et al. |
| 4,222,508 A | 9/1980 | Bott |
| 4,239,139 A | 12/1980 | Bott |
| 4,245,764 A | 1/1981 | Kowalski et al. |
| 4,264,025 A | 4/1981 | Ferguson et al. |
| 4,269,339 A | 5/1981 | Bott |
| 4,274,568 A | 6/1981 | Bott |
| 4,274,569 A | 6/1981 | Winter et al. |
| 4,274,570 A | 6/1981 | Bott |
| 4,277,009 A | 7/1981 | Bott |
| 4,295,587 A | 10/1981 | Bott |
| 4,323,182 A | 4/1982 | Bott |
| 4,326,655 A | 4/1982 | Gradek et al. |
| D264,203 S | 5/1982 | Bott |
| 4,342,411 A | 8/1982 | Bott |
| 4,350,380 A | 9/1982 | Williams |
| 4,358,037 A | 11/1982 | Heideman |
| 4,364,500 A | 12/1982 | Bott |
| 4,372,469 A | 2/1983 | Kowalski et al. |
| 4,401,247 A | 8/1983 | Zoor |
| 4,402,442 A | 9/1983 | Martino |
| 4,403,716 A | 9/1983 | Carlson et al. |
| 4,406,386 A | 9/1983 | Rasor et al. |
| 4,427,141 A | 1/1984 | Bott |
| 4,428,517 A | 1/1984 | Bott |
| 4,431,123 A | 2/1984 | Bott |
| 4,432,478 A | 2/1984 | Bott |
| 4,433,804 A | 2/1984 | Bott |
| 4,437,597 A | 3/1984 | Doyle |
| 4,440,333 A | 4/1984 | Bott |
| 4,442,961 A | 4/1984 | Bott |
| 4,448,336 A | 5/1984 | Bott |
| 4,448,337 A | 5/1984 | Cronce |
| 4,449,656 A | 5/1984 | Wouden |
| 4,460,116 A | 7/1984 | Bott |
| 4,469,261 A | 9/1984 | Stapleton et al. |
| 4,473,178 A | 9/1984 | Bott |
| 4,487,348 A | 12/1984 | Mareydt |
| 4,501,385 A | 2/1985 | Bott |
| 4,516,709 A | 5/1985 | Bott |
| 4,524,893 A | 6/1985 | Cole |
| D282,155 S | 1/1986 | Bott |
| 4,586,638 A | 5/1986 | Prescott et al. |
| 4,588,117 A | 5/1986 | Bott |
| 4,589,622 A | 5/1986 | Hutter |
| 4,616,771 A | 10/1986 | Heideman |
| 4,629,104 A | 12/1986 | Jacquet |
| 4,630,990 A | 12/1986 | Whiting |
| 4,639,039 A | 1/1987 | Nichols |
| 4,640,450 A | 2/1987 | Gallion et al. |
| 4,673,119 A | 6/1987 | Bott |
| 4,684,048 A | 8/1987 | Bott |
| 4,684,049 A | 8/1987 | Maby et al. |
| 4,688,706 A | 8/1987 | Thulin |
| 4,700,873 A | 10/1987 | Young |
| 4,702,398 A | 10/1987 | Seager |
| 4,702,401 A | 10/1987 | Graber et al. |
| RE32,583 E | 1/1988 | Bott |
| 4,717,165 A | 1/1988 | Johnson |

(56) References Cited

U.S. PATENT DOCUMENTS

| | | |
|---|---|---|
| 4,721,239 A | 1/1988 | Gibbs, III et al. |
| D294,340 S | 2/1988 | Robson |
| 4,724,692 A | 2/1988 | Turin et al. |
| 4,751,891 A | 6/1988 | Wilson |
| 4,754,905 A | 7/1988 | Bott |
| 4,757,929 A | 7/1988 | Nelson |
| 4,770,329 A | 9/1988 | Kamaya |
| 4,778,092 A | 10/1988 | Grace |
| 4,789,145 A | 12/1988 | Wenrich |
| D300,734 S | 4/1989 | Kruitbosch |
| 4,817,838 A | 4/1989 | Kamaya |
| 4,823,997 A | 4/1989 | Krieger |
| 4,830,249 A | 5/1989 | Mirenda et al. |
| 4,830,250 A | 5/1989 | Newbold et al. |
| 4,838,467 A | 6/1989 | Bott et al. |
| 4,848,112 A | 7/1989 | Graber et al. |
| 4,848,794 A | 7/1989 | Mader et al. |
| 4,875,608 A | 10/1989 | Graber |
| 4,877,168 A | 10/1989 | Bott |
| 4,877,169 A | 10/1989 | Grim |
| 4,887,754 A | 12/1989 | Boyer et al. |
| 4,890,777 A | 1/1990 | Bott |
| 4,892,279 A | 1/1990 | Lafferty et al. |
| 4,895,096 A | 1/1990 | Goodwin et al. |
| 4,899,917 A | 2/1990 | Bott |
| 4,911,348 A | 3/1990 | Rasor et al. |
| 4,917,428 A | 4/1990 | Sola |
| 4,917,429 A | 4/1990 | Giger |
| 4,934,572 A | 6/1990 | Bowman et al. |
| 4,944,439 A | 7/1990 | Bott |
| D310,196 S | 8/1990 | Bott |
| 4,960,356 A | 10/1990 | Wrenn |
| 4,961,524 A | 10/1990 | Hunts |
| 4,964,287 A | 10/1990 | Gaul |
| 4,967,945 A | 11/1990 | Bott |
| 4,972,983 A | 11/1990 | Bott |
| 4,976,123 A | 12/1990 | Ceron et al. |
| 4,993,615 A | 2/1991 | Arvidsson |
| 4,995,538 A | 2/1991 | Marengo |
| 4,997,332 A | 3/1991 | Johnson |
| 5,005,390 A | 4/1991 | Giannini et al. |
| 5,025,932 A | 6/1991 | Jay |
| 5,025,967 A | 6/1991 | Cronce et al. |
| 5,029,740 A | 7/1991 | Cox |
| 5,033,709 A | 7/1991 | Yuen |
| 5,037,019 A | 8/1991 | Sokn |
| 5,038,988 A | 8/1991 | Thulin |
| 5,042,705 A | 8/1991 | Johansson |
| 5,052,605 A | 10/1991 | Johansson |
| 5,056,700 A | 10/1991 | Blackburn et al. |
| 5,065,921 A | 11/1991 | Mobley |
| 5,118,020 A | 6/1992 | Piretti |
| 5,118,125 A | 6/1992 | Plunkett |
| 5,119,654 A | 6/1992 | Ceron et al. |
| 5,123,147 A | 6/1992 | Blair |
| 5,131,669 A | 7/1992 | Kinnamon et al. |
| 5,136,709 A | 8/1992 | Shirakabe et al. |
| 5,137,195 A | 8/1992 | Walter |
| 5,143,267 A | 9/1992 | Cucheran et al. |
| 5,158,425 A | 10/1992 | Bott |
| 5,169,042 A | 12/1992 | Ching |
| 5,169,044 A | 12/1992 | Englander |
| 5,170,920 A | 12/1992 | Corrente et al. |
| 5,201,487 A | 4/1993 | Epplett |
| 5,201,911 A | 4/1993 | Lee |
| 5,203,483 A | 4/1993 | Cucheran |
| 5,205,453 A | 4/1993 | Pudney et al. |
| 5,207,365 A | 5/1993 | Bott |
| 5,215,233 A | 6/1993 | Baldeck |
| 5,217,149 A | 6/1993 | Simonett |
| 5,226,341 A | 7/1993 | Shores |
| 5,226,570 A | 7/1993 | Pedrini |
| 5,226,634 A | 7/1993 | Rudy, Jr. et al. |
| 5,230,449 A | 7/1993 | Collins et al. |
| 5,232,134 A | 8/1993 | Allen |
| 5,232,138 A * | 8/1993 | Cucheran ............... B60R 9/045 224/321 |
| 5,236,153 A | 8/1993 | Laconte |
| 5,244,101 A | 9/1993 | Palmer et al. |
| 5,253,913 A | 10/1993 | Metivier |
| 5,257,710 A | 11/1993 | Cropley |
| 5,259,542 A | 11/1993 | Newbold et al. |
| 5,275,319 A | 1/1994 | Ruana |
| 5,275,320 A | 1/1994 | Duemmler |
| 5,282,560 A | 2/1994 | Ozog |
| 5,282,562 A | 2/1994 | Legault |
| 5,284,282 A | 2/1994 | Mottino |
| 5,291,763 A | 3/1994 | Cuisinot |
| 5,294,033 A | 3/1994 | Duemmler |
| 5,314,104 A * | 5/1994 | Lee ..................... B60R 9/045 224/309 |
| 5,320,264 A | 6/1994 | Weir |
| 5,326,007 A | 7/1994 | Pudney et al. |
| D349,680 S | 8/1994 | Powell |
| D350,527 S | 9/1994 | Parlor, Sr. |
| 5,346,355 A | 9/1994 | Riemer |
| 5,360,150 A | 11/1994 | Praz |
| 5,375,750 A | 12/1994 | Mandarino et al. |
| 5,385,285 A | 1/1995 | Cucheran et al. |
| 5,388,938 A | 2/1995 | Helton |
| 5,397,042 A | 3/1995 | Pedrini |
| 5,400,938 A | 3/1995 | Kolodziej et al. |
| 5,416,957 A | 5/1995 | Renzi, Sr. et al. |
| 5,419,479 A | 5/1995 | Evels et al. |
| 5,433,356 A | 7/1995 | Russell |
| 5,433,550 A | 7/1995 | Huber |
| 5,435,475 A | 7/1995 | Hudson et al. |
| 5,442,840 A | 8/1995 | Ewald |
| 5,443,190 A | 8/1995 | Cucheran et al. |
| 5,445,300 A | 8/1995 | Eipper et al. |
| 5,452,831 A | 9/1995 | Linnhoff |
| 5,456,396 A | 10/1995 | Allen |
| 5,456,512 A | 10/1995 | Gibbs et al. |
| 5,458,268 A | 10/1995 | Hill |
| 5,471,714 A | 12/1995 | Olson |
| 5,474,218 A | 12/1995 | Arsenault, Jr. et al. |
| 5,476,201 A | 12/1995 | Hall et al. |
| 5,492,258 A | 2/1996 | Brunner |
| 5,499,762 A | 3/1996 | Lee |
| D369,140 S | 4/1996 | Sills |
| 5,511,894 A | 4/1996 | Ng |
| 5,516,017 A | 5/1996 | Arvidsson |
| 5,526,971 A | 6/1996 | Despain |
| 5,535,930 A | 7/1996 | Lee |
| 5,549,231 A | 8/1996 | Fletcher et al. |
| D373,988 S | 9/1996 | Johnson |
| 5,553,761 A | 9/1996 | Audoire et al. |
| 5,556,221 A | 9/1996 | Brunner |
| 5,570,825 A | 11/1996 | Cona |
| 5,577,650 A | 11/1996 | Stapleton |
| 5,582,044 A | 12/1996 | Bolich |
| 5,598,959 A | 2/1997 | Lorensen et al. |
| 5,617,617 A | 4/1997 | Gustin |
| 5,624,063 A | 4/1997 | Ireland |
| 5,628,336 A | 5/1997 | Lee |
| 5,647,522 A | 7/1997 | Routh |
| 5,657,913 A | 8/1997 | Cucheran et al. |
| D386,145 S | 11/1997 | Staller |
| 5,692,659 A | 12/1997 | Reeves |
| 5,695,164 A | 12/1997 | Hartmann et al. |
| 5,697,629 A | 12/1997 | Guild |
| 5,701,628 A | 12/1997 | Morad |
| 5,709,521 A | 1/1998 | Glass et al. |
| 5,730,343 A | 3/1998 | Settelmayer |
| 5,738,258 A | 4/1998 | Farrow et al. |
| 5,762,248 A | 6/1998 | Englander et al. |
| 5,769,291 A | 6/1998 | Chasan |
| 5,769,292 A | 6/1998 | Cucheran et al. |
| 5,775,557 A | 7/1998 | Arvidsson |
| 5,779,119 A | 7/1998 | Talbot et al. |
| 5,806,735 A | 9/1998 | Christiansson et al. |
| 5,810,226 A | 9/1998 | Lee |
| 5,820,002 A | 10/1998 | Allen |
| 5,826,765 A | 10/1998 | Rak et al. |

(56) References Cited

U.S. PATENT DOCUMENTS

| | | | |
|---|---|---|---|
| 5,833,074 A | 11/1998 | Phillips | |
| 5,845,828 A | 12/1998 | Settelmayer | |
| 5,848,743 A | 12/1998 | Derecktor | |
| 5,862,966 A | 1/1999 | Mehls | |
| 5,868,621 A | 2/1999 | Parsons | |
| 5,871,190 A * | 2/1999 | Henriksson | B60R 9/058 224/331 |
| 5,875,947 A | 3/1999 | Noel et al. | |
| 5,924,614 A | 7/1999 | Kuntze et al. | |
| 5,944,198 A | 8/1999 | Ihalainen | |
| 5,951,231 A | 9/1999 | Allen | |
| 5,984,155 A | 11/1999 | Stapleton | |
| 5,988,403 A | 11/1999 | Robideau | |
| 5,992,645 A | 11/1999 | West | |
| 5,992,805 A | 11/1999 | Tanner | |
| 5,996,736 A | 12/1999 | Stankiewicz | |
| 6,010,048 A * | 1/2000 | Settelmayer | B60R 9/045 224/315 |
| 6,015,074 A | 1/2000 | Snavely et al. | |
| 6,019,266 A | 2/2000 | Johnson | |
| 6,050,467 A | 4/2000 | Drouillard et al. | |
| 6,053,336 A | 4/2000 | Reeves | |
| 6,062,450 A | 5/2000 | Noel et al. | |
| 6,102,265 A | 8/2000 | Stapleton | |
| 6,105,841 A | 8/2000 | Aftanas | |
| 6,112,965 A | 9/2000 | Lundgren | |
| 6,131,781 A | 10/2000 | Murray | |
| 6,164,507 A | 12/2000 | Dean et al. | |
| 6,176,404 B1 | 1/2001 | Fourel | |
| 6,182,876 B1 | 2/2001 | Moliner | |
| 6,189,868 B1 | 2/2001 | Santelli, Jr. | |
| 6,193,252 B1 | 2/2001 | Lin | |
| 6,244,483 B1 | 6/2001 | McLemore et al. | |
| 6,273,311 B1 | 8/2001 | Pedrini | |
| 6,276,747 B1 | 8/2001 | Ogawa et al. | |
| 6,279,802 B1 | 8/2001 | Hickman et al. | |
| 6,283,310 B1 | 9/2001 | Dean et al. | |
| 6,286,738 B1 | 9/2001 | Robins et al. | |
| 6,296,162 B1 | 10/2001 | Englander et al. | |
| 6,305,589 B1 | 10/2001 | Chimenti et al. | |
| 6,357,643 B1 | 3/2002 | Janner et al. | |
| 6,385,822 B1 | 5/2002 | Dean et al. | |
| D460,401 S | 7/2002 | Andersson | |
| 6,422,441 B1 | 7/2002 | Settelmayer et al. | |
| 6,439,397 B1 | 8/2002 | Reeves | |
| 6,460,743 B2 | 10/2002 | Edgerly et al. | |
| D467,220 S | 12/2002 | Walstrom et al. | |
| 6,488,249 B1 | 12/2002 | Girardi et al. | |
| 6,491,192 B2 | 12/2002 | Aki | |
| 6,491,195 B1 | 12/2002 | McLemore et al. | |
| 6,494,351 B1 | 12/2002 | Dean | |
| 6,516,985 B1 | 2/2003 | Lundgren | |
| 6,523,730 B2 | 2/2003 | Anderson | |
| 6,523,731 B1 | 2/2003 | Pedrini | |
| 6,557,931 B1 | 5/2003 | Tremmel et al. | |
| 6,561,398 B1 | 5/2003 | Cole et al. | |
| 6,568,644 B2 | 5/2003 | Pedersen | |
| 6,622,898 B1 | 9/2003 | Wang | |
| 6,640,979 B1 | 11/2003 | Mayfield | |
| 6,648,300 B2 | 11/2003 | Chamoun | |
| 6,662,982 B1 | 12/2003 | Päkkilä | |
| 6,681,971 B2 | 1/2004 | Laverack et al. | |
| D487,720 S | 3/2004 | Thomas | |
| 6,715,653 B2 | 4/2004 | DeCosta | |
| 6,722,541 B1 | 4/2004 | Aftanas et al. | |
| 6,736,300 B2 | 5/2004 | Deakin | |
| 6,736,301 B1 | 5/2004 | Huang | |
| 6,761,297 B1 | 7/2004 | Pedrini | |
| 6,766,929 B1 | 7/2004 | Karlsson | |
| 6,779,696 B2 | 8/2004 | Aftanas et al. | |
| 6,793,186 B2 | 9/2004 | Pedersen | |
| 6,796,471 B2 | 9/2004 | Aftanas et al. | |
| 6,817,500 B2 | 11/2004 | Neaux | |
| 6,840,418 B2 | 1/2005 | Robins et al. | |
| 6,843,394 B2 | 1/2005 | Aki | |
| 6,845,893 B2 | 1/2005 | Nelson | |
| 6,845,922 B2 | 1/2005 | Stark | |
| 6,857,545 B2 | 2/2005 | McLemore et al. | |
| 6,868,998 B2 | 3/2005 | Dean | |
| 6,892,912 B1 | 5/2005 | MacNeil | |
| 6,892,913 B1 | 5/2005 | Andersson | |
| 6,905,053 B2 | 6/2005 | Allen | |
| 6,918,521 B2 | 7/2005 | Settelmayer et al. | |
| 6,938,782 B2 | 9/2005 | Dean et al. | |
| 6,968,986 B1 | 11/2005 | Lloyd et al. | |
| 6,972,042 B2 | 12/2005 | Benson | |
| 6,976,615 B2 | 12/2005 | Dean | |
| 6,997,657 B1 | 2/2006 | Saward | |
| 7,000,811 B2 | 2/2006 | Gilstrap et al. | |
| 7,004,365 B2 | 2/2006 | Ingram | |
| 7,036,698 B2 | 5/2006 | Allen | |
| 7,044,347 B1 | 5/2006 | Pedrini | |
| 7,051,909 B2 | 5/2006 | Gibson | |
| 7,104,430 B2 | 9/2006 | Reeves | |
| 7,117,768 B1 | 10/2006 | Stoeppelwerth | |
| 7,131,561 B2 | 11/2006 | Humes | |
| 7,175,218 B1 | 2/2007 | Keene | |
| 7,182,233 B1 | 2/2007 | Graffy et al. | |
| 7,201,436 B2 | 4/2007 | Ludwig et al. | |
| 7,222,763 B2 | 5/2007 | Pedrini | |
| 7,234,617 B2 | 6/2007 | Weaver et al. | |
| 7,240,816 B2 | 7/2007 | Tsai | |
| D561,680 S | 2/2008 | Foley et al. | |
| D562,217 S | 2/2008 | Davis et al. | |
| D562,218 S | 2/2008 | Foley et al. | |
| 7,328,824 B2 | 2/2008 | Smith et al. | |
| D564,438 S | 3/2008 | Moore | |
| D566,034 S | 4/2008 | Davis et al. | |
| 7,357,283 B2 | 4/2008 | Settelmayer | |
| 7,367,481 B2 | 5/2008 | Barbara | |
| 7,404,504 B2 | 7/2008 | Settelmayer | |
| 7,413,143 B2 | 8/2008 | Frantz et al. | |
| 7,416,098 B2 | 8/2008 | Settelmayer et al. | |
| 7,427,049 B2 | 9/2008 | Kennedy et al. | |
| 7,481,344 B2 | 1/2009 | Näslund et al. | |
| 7,641,249 B2 | 1/2010 | Jung | |
| 7,648,151 B2 | 1/2010 | Pedrini | |
| 7,721,925 B1 | 5/2010 | Graffy et al. | |
| 7,726,528 B2 | 6/2010 | Foley | |
| 7,757,914 B2 | 7/2010 | Book et al. | |
| D622,208 S | 8/2010 | Sautter et al. | |
| 7,784,656 B2 | 8/2010 | Morrill et al. | |
| D623,117 S | 9/2010 | Farber | |
| 7,815,084 B2 | 10/2010 | Allen et al. | |
| D633,030 S | 2/2011 | Robertson | |
| D635,086 S | 3/2011 | Shen | |
| D638,778 S | 5/2011 | Giddens | |
| D642,113 S | 7/2011 | Farber | |
| 7,975,888 B2 | 7/2011 | Settelmayer | |
| 8,020,737 B2 | 9/2011 | Sweeney | |
| 8,021,169 B1 | 9/2011 | Smith | |
| 8,087,557 B2 | 1/2012 | Larsson et al. | |
| 8,104,651 B2 | 1/2012 | Bingham | |
| 8,113,398 B2 | 2/2012 | Sautter et al. | |
| 8,136,708 B2 | 3/2012 | Sautter et al. | |
| 8,136,709 B2 | 3/2012 | Jeli et al. | |
| D656,887 S | 4/2012 | Bogoslofski et al. | |
| 8,196,789 B2 | 6/2012 | Kraeuter et al. | |
| 8,210,407 B2 | 7/2012 | Sautter et al. | |
| 8,235,267 B2 | 8/2012 | Sautter et al. | |
| 8,245,893 B2 | 8/2012 | Sautter et al. | |
| D669,017 S | 10/2012 | Robertson | |
| 8,333,311 B2 | 12/2012 | Hubbard | |
| 8,393,508 B2 * | 3/2013 | Sautter | B60R 9/055 224/321 |
| 8,408,853 B2 | 4/2013 | Womack et al. | |
| 8,505,793 B2 | 8/2013 | Foley | |
| 8,544,707 B2 | 10/2013 | Hubbard | |
| 8,668,181 B2 | 3/2014 | Dazet et al. | |
| D703,605 S | 4/2014 | Sautter et al. | |
| 8,763,870 B2 | 7/2014 | Davis | |
| D717,722 S | 11/2014 | Cagampang et al. | |
| 8,925,775 B2 | 1/2015 | Sautter et al. | |
| 9,102,274 B2 | 8/2015 | Hubbard | |

(56) References Cited

U.S. PATENT DOCUMENTS

| | | |
|---|---|---|
| 9,132,782 B2 | 9/2015 | Hubbard |
| 9,409,527 B2 | 8/2016 | Hubbard |
| 2001/0013528 A1* | 8/2001 | Chimenti ............ B60R 9/045 224/321 |
| 2002/0053581 A1 | 5/2002 | Peschmann et al. |
| 2002/0125282 A1 | 9/2002 | Laverack et al. |
| 2003/0071097 A1 | 4/2003 | Dean |
| 2003/0164390 A1 | 9/2003 | Higginbotham, III |
| 2003/0178457 A1 | 9/2003 | Wang |
| 2003/0222112 A1 | 12/2003 | McLemore et al. |
| 2004/0118886 A1 | 6/2004 | Mirshafiee et al. |
| 2004/0211801 A1 | 10/2004 | Barbara |
| 2004/0238582 A1 | 12/2004 | Pedrini |
| 2005/0029320 A1 | 2/2005 | Chimenti et al. |
| 2005/0051585 A1 | 3/2005 | Kamiya et al. |
| 2005/0061842 A1 | 3/2005 | Tsai |
| 2005/0077335 A1 | 4/2005 | Bourne |
| 2005/0145639 A1 | 7/2005 | Viklund et al. |
| 2005/0205626 A1 | 9/2005 | Dean |
| 2005/0284905 A1 | 12/2005 | Naslund et al. |
| 2006/0000859 A1 | 1/2006 | Frischer |
| 2006/0029483 A1 | 2/2006 | Allen et al. |
| 2006/0049324 A1 | 3/2006 | Smith et al. |
| 2006/0060622 A1 | 3/2006 | Prenger |
| 2006/0086766 A1 | 4/2006 | Settelmayer |
| 2006/0208022 A1 | 9/2006 | Karlsson |
| 2006/0249466 A1 | 11/2006 | Wang |
| 2006/0273122 A1 | 12/2006 | Bogoslofski et al. |
| 2006/0273123 A1 | 12/2006 | Settelmayer |
| 2006/0273124 A1 | 12/2006 | Bogoslofski |
| 2006/0289577 A1 | 12/2006 | Malone |
| 2007/0036628 A1 | 2/2007 | Womack et al. |
| 2007/0108243 A1 | 5/2007 | Bingham |
| 2007/0119887 A1 | 5/2007 | Foley |
| 2007/0119888 A1 | 5/2007 | Chuang |
| 2007/0164065 A1 | 7/2007 | Davis |
| 2008/0000940 A1 | 1/2008 | Wang |
| 2008/0029563 A1 | 2/2008 | Malone |
| 2008/0053926 A1 | 3/2008 | Foley |
| 2008/0099522 A1 | 5/2008 | Clausen et al. |
| 2008/0101883 A1 | 5/2008 | Derecktor |
| 2008/0164292 A1 | 7/2008 | Farney |
| 2008/0193265 A1 | 8/2008 | Sautter et al. |
| 2008/0257924 A1 | 10/2008 | Kmita et al. |
| 2009/0014489 A1 | 1/2009 | Settelmayer et al. |
| 2009/0120984 A1 | 5/2009 | Sautter et al. |
| 2009/0159624 A1 | 6/2009 | Johnson et al. |
| 2009/0184189 A1 | 7/2009 | Soderberg et al. |
| 2009/0236382 A1 | 9/2009 | Sautter et al. |
| 2010/0078454 A1 | 4/2010 | Sautter et al. |
| 2010/0237116 A1 | 9/2010 | Hubbard |
| 2010/0282799 A1 | 11/2010 | Hubbard |
| 2010/0308091 A1 | 12/2010 | Hubbard |
| 2011/0132946 A1 | 6/2011 | Sautter et al. |
| 2011/0139838 A1 | 6/2011 | Sautter et al. |
| 2011/0139841 A1 | 6/2011 | Sautter et al. |
| 2011/0139842 A1 | 6/2011 | Sautter et al. |
| 2011/0174853 A1 | 7/2011 | Hubbard |
| 2011/0290836 A1 | 12/2011 | Shen |
| 2013/0020361 A1 | 1/2013 | Sautter et al. |
| 2013/0022440 A1 | 1/2013 | Sautter et al. |
| 2013/0037585 A1 | 2/2013 | Hubbard et al. |
| 2013/0062379 A1 | 3/2013 | Sautter et al. |
| 2013/0062383 A1 | 3/2013 | Jeli |
| 2013/0062385 A1 | 3/2013 | Pedrini |
| 2013/0175308 A1 | 7/2013 | Sautter et al. |
| 2013/0200121 A1 | 8/2013 | Hubbard |
| 2013/0214020 A1 | 8/2013 | Pedrini |
| 2013/0284779 A1 | 10/2013 | Sautter et al. |
| 2014/0028007 A1 | 1/2014 | Pfeiffer et al. |
| 2014/0097220 A1 | 4/2014 | Sautter et al. |
| 2014/0144958 A1 | 5/2014 | Sautter et al. |
| 2014/0144959 A1 | 5/2014 | Sautter et al. |
| 2014/0144960 A1 | 5/2014 | Condon et al. |
| 2014/0158728 A1 | 6/2014 | Sautter et al. |
| 2014/0158729 A1 | 6/2014 | Pedrini |
| 2014/0166709 A1 | 6/2014 | Hubbard |
| 2015/0069102 A1 | 3/2015 | Hubbard |
| 2015/0232038 A1 | 8/2015 | Robertson |
| 2015/0239402 A1 | 8/2015 | Hubbard |

FOREIGN PATENT DOCUMENTS

| | | |
|---|---|---|
| AU | 2008301329 B2 | 8/2012 |
| AU | 348922 | 5/2013 |
| AU | 2008304016 B2 | 1/2014 |
| CA | 971140 A | 7/1975 |
| CN | 87104266 A | 3/1988 |
| CN | 2445963 Y | 9/2001 |
| CN | 101559737 A | 10/2009 |
| CN | 101559738 A | 10/2009 |
| CN | 101868375 A | 10/2010 |
| CN | 201677818 U | 12/2010 |
| CN | 102177047 A | 9/2011 |
| CN | 101861257 B | 11/2012 |
| CN | 101868376 B | 3/2013 |
| CN | 102975661 A | 3/2013 |
| CN | 102177047 B | 2/2015 |
| DE | 2940095 A1 | 4/1981 |
| DE | 2950449 A1 | 6/1981 |
| DE | 3034226 A1 | 4/1982 |
| DE | 3201409 A1 | 9/1983 |
| DE | 3209912 A1 | 10/1983 |
| DE | 3614740 A1 | 11/1987 |
| DE | 3626479 A1 | 2/1988 |
| DE | 3637856 A1 | 5/1988 |
| DE | 8801618 U1 | 8/1988 |
| DE | 3912692 A1 | 11/1989 |
| DE | 4229268 A1 | 3/1994 |
| DE | 4423607 C1 | 6/1995 |
| DE | 20007760 U1 | 8/2000 |
| DE | 20309766 U1 | 9/2003 |
| DE | 202005007566 U1 | 7/2005 |
| EP | 0019873 B1 | 10/1982 |
| EP | 0151907 A2 | 8/1985 |
| EP | 0193501 A2 | 9/1986 |
| EP | 0433495 A1 | 12/1989 |
| EP | 0482650 A1 | 4/1992 |
| EP | 0504588 A1 | 9/1992 |
| EP | 0511179 A1 | 10/1992 |
| EP | 0646074 B1 | 10/1996 |
| EP | 0398885 B2 | 6/1997 |
| EP | 0869879 A | 10/1998 |
| EP | 0894672 A1 | 2/1999 |
| EP | 0945307 A2 | 9/1999 |
| EP | 0989029 A1 | 3/2000 |
| EP | 1285817 A2 | 2/2003 |
| EP | 1340652 A1 | 9/2003 |
| EP | 1340653 A2 | 9/2003 |
| EP | 1422940 A1 | 8/2004 |
| EP | 1205358 B1 | 7/2005 |
| EP | 1568542 A1 | 8/2005 |
| EP | 1712420 A1 | 10/2006 |
| EP | 2334514 A | 6/2011 |
| EP | 2437961 A | 2/2012 |
| EP | 2507095 A | 10/2012 |
| EP | 2303641 B1 | 11/2012 |
| EP | 002172445-0001 | 4/2013 |
| EP | 002231878-0001 | 7/2013 |
| EP | 002343582-0001 | 1/2014 |
| EP | 002343756-0001 | 1/2014 |
| EP | 2200869 B1 | 4/2014 |
| EP | 2200867 B1 | 6/2014 |
| EP | 2758275 A | 7/2014 |
| EP | 2200868 B1 | 8/2014 |
| FR | 1400231 A | 4/1965 |
| FR | 2481209 A1 | 10/1981 |
| FR | 2501601 A1 | 9/1982 |
| FR | 2519305 A1 | 7/1983 |
| FR | 2600953 A1 | 1/1988 |
| FR | 2624808 A2 | 6/1989 |
| FR | 2632595 A1 | 12/1989 |
| FR | 2711346 A1 | 4/1995 |
| FR | 2752793 A1 | 3/1998 |

(56) References Cited

FOREIGN PATENT DOCUMENTS

| | | |
|---|---|---|
| GB | 886743 A | 1/1962 |
| GB | 1045619 A | 10/1966 |
| GB | 1311367 A | 3/1973 |
| GB | 2257463 A | 1/1993 |
| GB | 2277309 A | 10/1994 |
| GB | 2303344 A | 2/1997 |
| GB | 2475916 A | 6/2011 |
| JP | 63-53143 A | 3/1988 |
| JP | 9-20181 A | 1/1997 |
| JP | 10-250488 A | 9/1998 |
| JP | 2000-318538 A | 11/2000 |
| MX | 2011012988 A | 3/2012 |
| NZ | 551764 A | 3/2009 |
| NZ | 561809 A | 11/2009 |
| NZ | 561860 A | 4/2010 |
| NZ | 561811 A | 6/2010 |
| NZ | 571287 A | 3/2011 |
| NZ | 592162 A | 7/2012 |
| TW | 201111201 A | 4/2011 |
| WO | 9110581 A1 | 7/1991 |
| WO | 9202385 A1 | 2/1992 |
| WO | 9410007 A2 | 5/1994 |
| WO | 9624509 A1 | 8/1996 |
| WO | 9638336 A1 | 12/1996 |
| WO | 9702976 A1 | 1/1997 |
| WO | 9708017 A1 | 3/1997 |
| WO | 9810959 A1 | 3/1998 |
| WO | 9954168 A1 | 10/1999 |
| WO | 03006277 A1 | 1/2003 |
| WO | 2005021332 A1 | 3/2005 |
| WO | 2005102013 A2 | 11/2005 |
| WO | 2009038479 A1 | 3/2009 |
| WO | 2009038480 A1 | 3/2009 |
| WO | 2009041828 A1 | 4/2009 |
| WO | 2009158358 A1 | 12/2009 |
| WO | 2009158360 A1 | 12/2009 |
| WO | 2010030198 A1 | 3/2010 |
| WO | 2010141944 A1 | 12/2010 |
| WO | 2010144369 A1 | 12/2010 |
| WO | 2010148011 A1 | 12/2010 |
| WO | 2011084075 A1 | 7/2011 |
| WO | 2013036939 A1 | 3/2013 |
| WO | 2013040267 A1 | 3/2013 |
| WO | 2013164692 A2 | 11/2013 |
| WO | 2013165640 A1 | 11/2013 |
| WO | 2014022435 A1 | 2/2014 |

OTHER PUBLICATIONS

Roof Mounted Bike Racks sold by Bike Racks Plus. [Retrieved on Mar. 20, 2007]. © 2002-2005. Retrieved from the Internet <URL: http://www.bike-racks-plus.com/Roof_Mounted_Bike_Racks_y.htm>, 3 pages.

Rack Attack Portland's Blog, "Another hit from Yakima! The all new factory-compatible FrontLoader upright bike rack", Mar. 29, 2010, Retrieved from the Internet on Oct. 11, 2012, URL: http://rackattackportland.wordpress.com/2010/03/29another-hit-from-yakima-the-all-new-factory-compatible-frontloader-upright-bike-rack/, 3 pages.

Yakima FrontLoader upright bike rack review, Apr. 17, 2010, Retrieved from the Internet on Oct. 11, 2012, URL: http://carracks.blogspot.nl/2010/04/yakima-frontloader-upright-bike-rack.html, 2 pages.

ORS Racks Direct.com, "Yakima FrontLoader Bike Rack Review Video by ORS Racks Direct", May 19, 2010, Retrieved from the Internet on Oct. 11, 2012, URL:http://www.youtube.com/watch?v=cu8rHM90Rdw, 9 pages.

Heinlen, Jerry, "Yakima FrontLoader Recall Information", Apr. 28, 2011, Retrieved from the Internet on Oct. 11, 2012, URL:http://firecall.yakima.com, 2 pages.

Yakima, "Frontloader", Oct. 11, 2012, Retrieved from the Internet on Oct. 11, 2012, URL:http://yakima.com/shop/bike/roof/frontloader=pr-header-8002103, 5 pages.

\* cited by examiner

CROSSBAR CLAMP ACTUATOR

CROSS-REFERENCES

This application is based upon and claims the benefit under 35 U.S.C. § 119(e) of U.S. Provisional Patent Application Ser. No. 62/173,333, filed on Jun. 9, 2015, and U.S. Provisional Patent Application Ser. No. 62/175,192, filed on Jun. 12, 2015, which are incorporated herein, in their entireties, for all purposes.

The following related applications and materials are incorporated herein, in their entireties, for all purposes: U.S. Pat. No. 6,905,053, and U.S. Pat. No. 8,387,839.

FIELD

This disclosure relates to systems and methods for attaching cargo racks to vehicles. More specifically, the disclosed embodiments relate to crossbar-to-vehicle couplers and related clamping systems.

INTRODUCTION

Popularity of recreational activities continues to grow, with a corresponding growth in the need for carrying recreational equipment and cargo on vehicles. Accordingly, various equipment carriers and accessories have been developed over the years, for recreational items such as bicycles, skis, surf boards, standup paddle boards, kayaks, and the like. Many such carriers and accessories are supported on rooftop racks.

Meanwhile, the number of different vehicle rooftop configurations has grown as well, with various shapes, sizes, and features depending on the make and model of the vehicle. For example, rooftop rails may be flush on the roof, raised, or not present at all. Similarly, rooftops themselves may be relatively flat or curved, and a width of the roof may change from front to back.

Rooftop racks typically include crossbars mounted to the vehicle roof, and the crossbars themselves may be of various shapes and sizes, from square to round to aerodynamic.

With all this variation, rooftop rack systems must typically incorporate a myriad of components customized to fit each style of roof and rooftop feature. A need exists for a simplified system of crossbars, support towers, and connection features, with a reduction in customized components.

SUMMARY

The crossbar clamp actuator, as well as related systems and methods according to the present teachings, allow attachment and actuation of various crossbar clamps associated with different crossbars to several coupler styles.

In some embodiments, a rack for carrying cargo on top of a vehicle may include a crossbar and a pair of couplers configured to mount the crossbar on top of a vehicle such that a long axis of the crossbar is substantially horizontal and perpendicular to a longitudinal axis of the vehicle; wherein each coupler includes: a crossbar clamp having a crossbar seat and a crossbar connector movable relative to the crossbar seat; and a crossbar clamp actuator comprising a horizontally traveling wedge block having a ramped, downward-facing first slide surface, and a wedge follower coupled to and movable with the crossbar connector, the wedge follower having a second slide surface in frictional contact with the first slide surface of the traveling wedge block, such that substantially horizontal repositioning of the traveling wedge block causes the ramped first slide surface to urge the wedge follower downward.

In some embodiments, a coupler for mounting a cargo rack to a vehicle may include a coupler having a vehicle interface clamp configured to releasably secure the coupler to a vehicle feature, and a crossbar clamp actuator including a traveling wedge block having a ramped first slide surface, and a movable wedge follower having a second slide surface in frictional contact with the first slide surface of the traveling wedge block; and a crossbar clamp having a first clamping portion operatively connected to and movable with the wedge follower and a second clamping portion fixed relative to the coupler; wherein repositioning of the traveling wedge block along a first path causes the ramped first slide surface to urge the wedge follower along a second path substantially orthogonal to the first path.

In some embodiments, a method for attaching a crossbar to a vehicle may include connecting a crossbar clamp to a clamp actuator of a coupler assembly, the clamp actuator having a traveling wedge block operatively connected to a movable wedge follower, such that a first portion of the crossbar clamp is attached to and movable with the wedge follower; capturing a crossbar with the first portion of the crossbar clamp; and clamping the crossbar to the coupler assembly by repositioning the traveling wedge block in a first direction across the movable wedge follower, such that the movable wedge follower is forced in a second direction, urging the first portion of the crossbar clamp into a clamping position; wherein the first direction is substantially parallel to a long axis of the crossbar.

Features, functions, and advantages may be achieved independently in various embodiments of the present disclosure, or may be combined in yet other embodiments, further details of which can be seen with reference to the following description and drawings.

DESCRIPTION

Various aspects and examples of crossbar clamp actuators and crossbar clamps suitable for use with a variety of crossbar-to-vehicle couplers, as well as related systems and methods, are described below and illustrated in the associated drawings. Unless otherwise specified, a crossbar clamp actuator and/or crossbar clamp according to the present teachings and/or its various components may, but are not required to, contain at least one of the structure, components, functionality, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

Definitions

The following definitions apply herein, unless otherwise indicated.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

The terms "inboard," "outboard," "forward," "aft," and the like are intended to be understood in the context of a host vehicle on which systems described herein may be mounted or otherwise attached. Terms regarding lateral orientation or positioning may be considered relative to an imaginary central vertical plane dividing the vehicle into left and right sides. For example, "outboard" may indicate a relative position that is laterally farther from the central vertical plane, or a direction that is away from the central vertical plane. Conversely, "inboard" may indicate a direction toward the central vertical plane, or a relative position that is closer to the central vertical plane. Similarly, "forward" means toward the front of the vehicle, and "aft" means toward the rear of the vehicle. In the absence of a host vehicle, the same directional terms may be used as if the vehicle were present. For example, even when viewed in isolation, a crossbar may have a "forward" edge, based on the fact that the edge in question would be installed facing the front portion of a host vehicle.

Overview of a Roof Rack System

Figure 1:
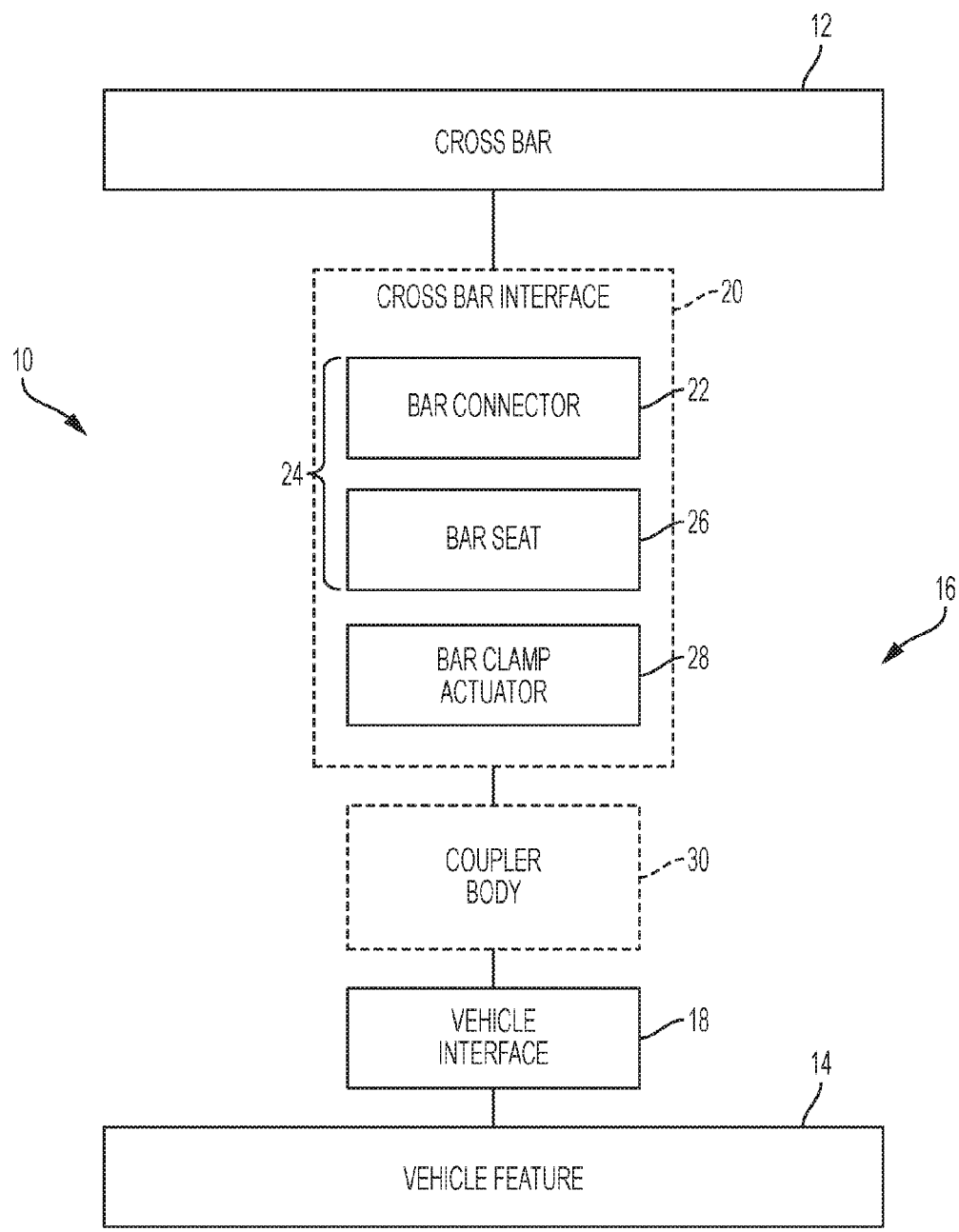
FIG. 1 is a schematic block diagram of a rooftop cargo rack system.

In general, and with reference to FIG. 1, a vehicle roof rack system 10 may include any suitable combination of components configured to removably and securely affix a selected crossbar to a vehicle rooftop. The crossbar is supported at either end by a pair of supports having features that facilitate attachment to corresponding feature(s) on the specific host vehicle. The crossbar supports may also be referred to as towers, feet, or mounts, and are referred to herein as couplers. A versatile and efficient system may be provided to fit a selected crossbar to the wide range of vehicle rooftops present in the marketplace.

Accordingly, roof rack system 10 may include one or more types of crossbars 12 suitable for use on a range of vehicles. Each type of crossbar 12 may include any suitable crossbar configured to be mounted transverse to the longitudinal axis of a vehicle, across a rooftop, and to support loads placed thereon. For example, a crossbar 12 may support a bicycle carrier, ski carrier, kayak carrier, and/or the like. Crossbars are typically mounted on a vehicle in pairs, such that a forward and an aft crossbar are present on the host vehicle for proper load carrying. Crossbars 12 may have any suitable cross section, such as round, square, teardrop, aerodynamic, and/or any other suitable shape or combination of shapes. Specific embodiments of crossbars 12 are described in further detail below.

Crossbars 12 are supported by attaching or fastening each of the crossbars to one or more specific vehicle features 14. Vehicles come in many shapes and sizes, with a corresponding array of roof topologies. Vehicle features 14, to which the crossbars may be attached, can include raised rails running along lateral sides of a rooftop, flush rails with no space between the rails and the roof, channels or hard points on the roof, side edges or gutters of a naked roof, and/or the like.

To fasten the outboard ends of the crossbars to features 14, system 10 may include one or more couplers 16, also referred to as supports, towers, feet, or mounts, as mentioned above. Each coupler 16 may include any suitable vehicle interface 18 configured to attach, clamp, and/or removably connect to one or more vehicle features 14. Each coupler 16 may also include any suitable crossbar interface 20 configured to provide an attachment point or mount for a crossbar 12.

In some examples, crossbar interface 20 may include a universal interface for connecting a variety of crossbars. Each specific crossbar 12 may include or be associated with a crossbar connector 22 (also referred to as an adapter) configured to comprise a crossbar-specific bar clamp 24 when combined with a crossbar seat 26. Crossbar interface 20 may include a threaded bolt protruding upward from support 16. In this example, crossbar connector 22 may include a threaded portion for receiving the threaded bolt, as well as a holder portion for gripping, grasping, or grabbing onto the specific crossbar. Various crossbar connectors may each be attachable, interchangeably, to the same threaded bolt of the interface.

Bar clamp 24 may be used to removably and securely attach crossbar 12 to coupler 16. Accordingly, crossbar interface 20 of coupler 16 includes a crossbar (or bar) clamp actuator 28 configured to tighten, draw together, or otherwise cause clamp 24 to securingly engage the crossbar. Bar clamp actuator 28 may include a manual actuator or manual actuating mechanism. Illustrative examples of bar clamp actuators 28 are described in detail below.

Crossbar connector 22 and/or crossbar seat 26 may be grouped or provided with crossbar 12 to form a kit suitable for connecting to remaining elements of crossbar interface 20 of one or more different couplers 16. In other examples, crossbar connector 22 and/or crossbar seat 26 may be grouped or provided with coupler 16, to form a customized coupler suitable for connecting to a specific crossbar 12. From these examples, it should be clear that selected combinations of subcomponents of system 10 may be provided independently or separately, and combined or assembled as appropriate (e.g., for a specific vehicle).

In some examples, coupler 16 may include a body or body portion 30 providing structural and/or other functional aspects of the coupler, e.g., locking devices, environmental, aesthetic, and/or aerodynamic outer housing features, internal support structure, etc. Vehicle interface 18 and/or crossbar interface 20 may be attached, unitary with, and/or coupled to coupler body portion 30. Alternatively or additionally, crossbar interface 20 and vehicle interface 18 may be coupled to each other.

Vehicle interface 18 may include any suitable structure and/or device configured to removably attach to a given vehicle feature (or features) 14. For example, vehicle interface 18 may include a clamp, hook, bolt, clip, strap, and/or the like, and/or any combination of these. To provide an efficient and versatile system, a selected number of vehicle interface types may be provided, some having modifiable or selectable components for further customization. Specific examples of vehicle interfaces 18 are mentioned in the examples below.

Accordingly, system 10 may allow a user to choose a crossbar 12, select a coupler 16 having a vehicle interface 18 appropriate for attachment to vehicle feature 14 of the user's vehicle, and clamp the crossbar to the support using a corresponding clamp comprising crossbar connector 22 and crossbar seat 26.

Figure 2:
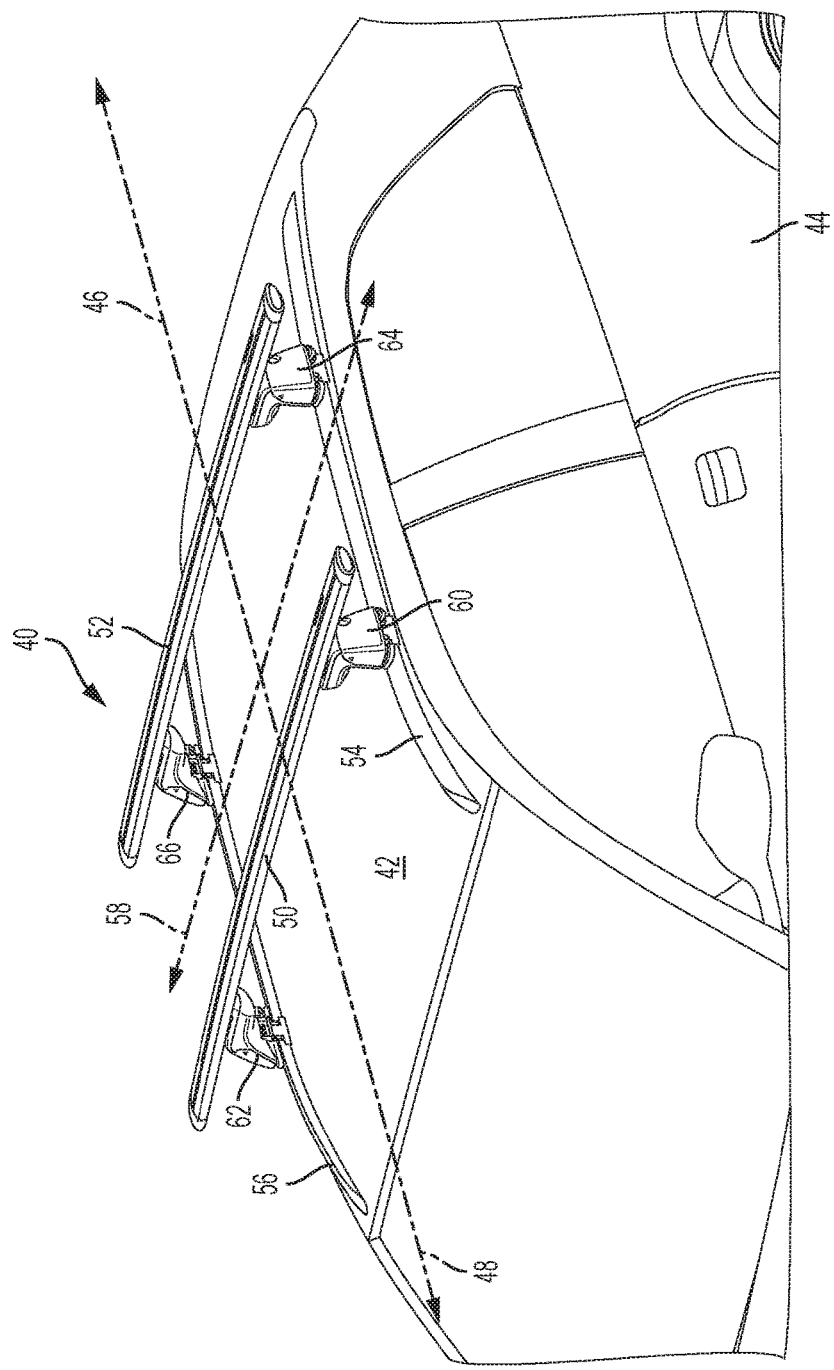
FIG. 2 is an oblique isometric view of a portion of an illustrative vehicle showing an illustrative rooftop rack mounted thereon.

Turning to FIG. 2, a specific example of a roof rack 40 is depicted, attached to an illustrative roof 42 of a vehicle 44. Roof rack 40 is a selected example of roof rack 10, described above. Accordingly, similar components may be labeled with similar reference numbers. Rack 40 may be used for carrying cargo and/or cargo-specific accessories on top of vehicle 44. Vehicle 44 has a longitudinal axis 46 generally coinciding with (e.g., running parallel to) a direction of vehicular travel 48.

Rack 40 includes a pair of crossbars 50 and 52 having aerodynamic shapes and attached to flush rail features 54 and 56 of vehicle roof 42. Each crossbar is supported and mounted on vehicle 44 by a respective pair of couplers configured to mount the crossbar on top of the vehicle with the crossbar substantially perpendicular to longitudinal axis 46. Accordingly, crossbars 50 and 52 are substantially parallel to each other and oriented across a width of the vehicle roof, as generally indicated by a lateral axis 58 in FIG. 2. Crossbar 50 is mounted on top of the vehicle by couplers 60 and 62, and crossbar 52 is mounted on top of the vehicle using couplers 64 and 66. In this example, couplers 60, 62, 64, 66 have a double-clip style vehicle interface configured to clamp to the flush bar vehicle features. Other styles may be suitable, and other vehicle features may be present.

Examples, Components, and Alternatives

The following sections describe selected aspects of exemplary couplers, crossbar clamp actuators, crossbar clamps, and related systems and/or methods. The examples in these sections are intended for illustration and should not be interpreted as limiting the entire scope of the present disclosure. Each section may include one or more distinct inventions, and/or contextual or related information, function, and/or structure.

Illustrative Crossbar-to-Vehicle Coupler

Figure 3:
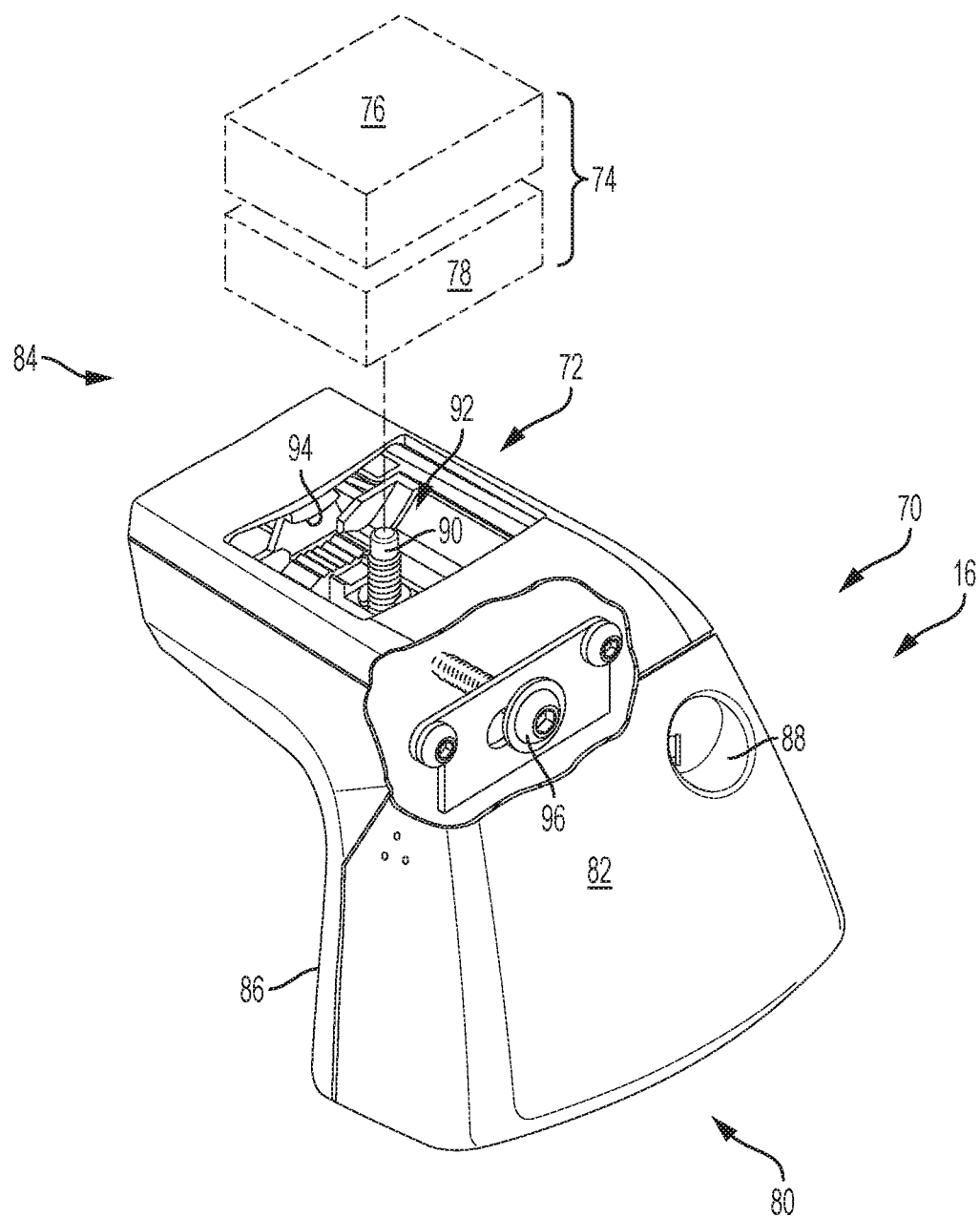
FIG. 3 is a partially schematic diagram of an illustrative crossbar-to-vehicle coupler in accordance with aspects of the present disclosure.

As shown in FIG. 3, this section describes an illustrative coupler 70 having a crossbar clamp actuator 72. Coupler 70 is an example of couplers 16 described above. Accordingly, similar components may be labeled with similar reference numbers.

FIG. 3 is an oblique isometric view showing the interface provided by the coupler and clamp actuator. A bar clamp 74 is shown schematically, including a bar connector 76 and a bar seat 78, to illustrate that various such clamp components may be interchangeably utilized with clamp actuator 72. In similar fashion, clamp actuator 72 may be incorporated into various couplers. Accordingly, in some examples, this type of clamp actuator may be referred to as a universal connector, or the like.

As described above, coupler 70 includes a vehicle interface portion 80, a body 82, and a crossbar interface portion 84. Coupler 70 includes an outer case or housing 86, which in this example includes a locking feature 88 configured to prevent unwanted access to internal components. One or more portions of outer housing 86 may be selectively removable by a user.

As indicated schematically in FIG. 3, crossbar clamp 74 is configured to be attachable to a threaded member 90 of clamp actuator 72. Any suitable clamp may be used. In the examples described here and below, a two-piece clamp is utilized, comprising bar seat 78 and bar connector 76. In these examples, bar seat 78 includes any suitable structure configured to support the crossbar and function as an anvil against which the bar is secured (i.e., clamped). In some examples, bar seat 78 includes a crossbar-facing seating surface that conforms to an expected shape of the crossbar. In some examples, bar seat 78 is configured to nest on, mount to, or mate with a supporting surface 92 of coupler 62. One or more retaining features 94 of coupler 62 may be utilized (temporarily or otherwise) to hold bar seat 78 in place.

Crossbar connector 76 may include any suitable structure configured to be securely attachable to coupler 70 (e.g., at threaded member 90) and to capture, grab, connect with, encompass, slot into, engage, mate with, latch onto, or otherwise hold a portion of a crossbar. In some examples, different crossbar connectors may be provided corresponding to respective different types of crossbars.

Clamp actuator 72 includes any suitable structure and/or mechanism manually or automatically operable to urge bar connector 76 into a clamping position relative to bar seat 78, such that the connector and the bar seat secure the crossbar when clamped. For example, a portion of the crossbar may be clamped between the connector and the bar seat. In some examples, the actuator may pull the bar connector downward such that the crossbar is pulled with the connector and secured onto the crossbar seat. In some examples, actuator 72 may cause a pinching action between the bar connector and the bar seat, securing a portion of the crossbar. Actuator 72 may be reversibly operable, such that the same actuator may be used to disengage the clamp from the crossbar. In some examples, actuator 72 may be used to actively or affirmatively urge connector 76 away from crossbar seat 78. In some examples, actuator 72 may be used to release a securing force or pressure, such that the connector and seat can be manually separated.

In addition to securing clamp 74 to coupler 70, threaded member 90 may form a part of actuator 72. For example, rotation of threaded member 90 may, alone or in combination with other features, result in a clamping action. However, clamp operation via manipulation of threaded member 90 alone may require continued access to threaded member 90, which may not be desirable and/or practical in all operational situations or configurations. Accordingly, in some examples, clamp 74 is attached to the coupler and/or actuator by member 90, and actuator 72 includes a separate and/or related actuation mechanism. For example, a tightening screw 96 may be operatively connected to threaded member 90, such that rotation of screw 96 causes threaded member 90 to move up and/or down to actuate clamp 74. As shown in FIG. 3, screw 96 may be horizontal and accessible from an outboard side of the coupler (e.g., after removing a panel or other portion of housing 86). A length of screw 96 may be oriented parallel to a long axis of the crossbar, i.e., transverse to the longitudinal axis of the vehicle.

Illustrative Crossbar Clamps

As shown in FIGS. 4-7, this section describes three examples of crossbar clamps. These crossbar clamps are each an example of crossbar clamps 24 and 74, described above. As such, corresponding components may be labeled and/or associated with the same or similar reference numbers.

Figure 4:
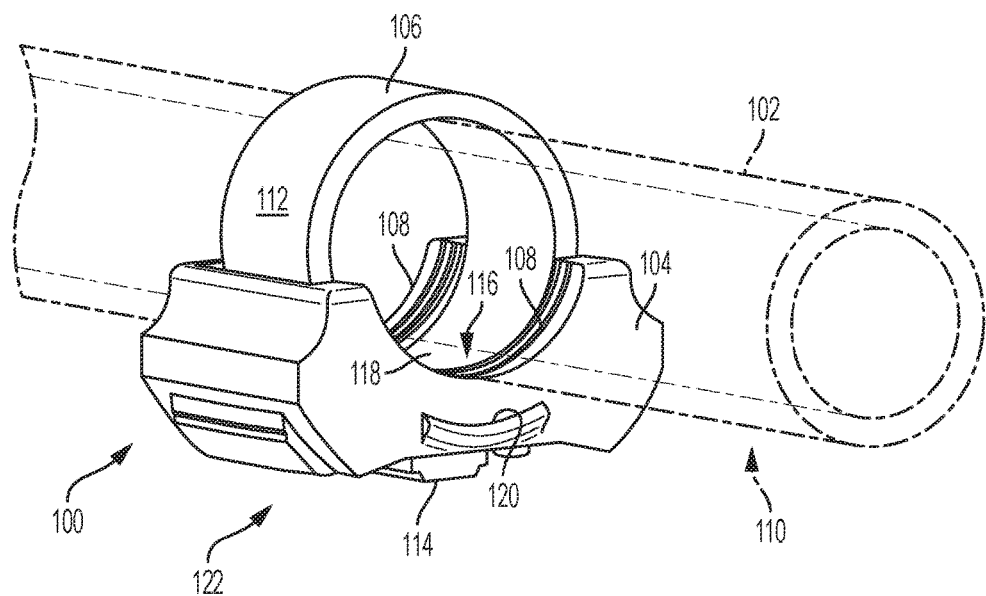
FIG. 4 is an isometric view of an illustrative crossbar clamp suitable for round crossbars.

FIG. 4 depicts an illustrative clamp 100 suitable for use with a substantially round crossbar 102. Clamp 100 includes a crossbar seat 104 and a crossbar connector 106. Crossbar seat 104 may include any suitable structure configured to cradle crossbar 102 on a seating surface 108 that generally conforms to an outer surface 110 of the crossbar. Crossbar seat 104 may be described as an anvil or a fixed jaw. In some examples, seating surface 108 may include a resilient, compressible, and/or compliant layer, such as a rubber coating, to reduce damage to crossbar 102.

Crossbar connector 106 may include any suitable structure configured to capture (e.g., grasp or grip) crossbar 102, and to be movable relative to crossbar seat 104, such that the captured crossbar can be urged or forced against seating surface 108. Crossbar connector 106 may be interchangeably referred to as a crossbar capturing member or crossbar capturing portion of clamp 100.

In this example, crossbar connector 106 includes a sleeve portion 112 and a stem portion 114. Sleeve portion 112 is a substantially cylindrical tube or collar generally conforming to but slightly larger than an outer diameter of the round crossbar. Sleeve portion 112 may freely slide on crossbar 102. Stem portion 114 extends or protrudes radially from an outer surface of sleeve portion 112. Stem portion 114 may include a fastening mechanism, such as a threaded hole, for attaching connector 106 to a clamp actuator.

Crossbar seat 104 includes a block having an aperture 116 running vertically through the block, and through which crossbar connector 106 can at least partially extend. For example, stem portion 114 may extend through aperture 116. In some examples, stem portion 114 may be connectible to an actuator, such that the actuator can pull crossbar connector 106 downward through aperture 116. As can be seen in FIG. 4, this action causes crossbar 102 to be pulled down onto crossbar seat 104, thereby arresting the downward motion of the crossbar connector and clamping the crossbar in place. As depicted in FIG. 4, a lower inner surface 118 of sleeve portion 112 may be pulled below seating surface 108. This may be facilitated by the larger diameter of sleeve portion 112 and/or an elastic deformation of sleeve portion 112 as a downward force is applied by the actuator. In some examples, crossbar 102 may be a steel crossbar and sleeve portion 112 may comprise aluminum.

Crossbar seat 104 also includes a retention ridge 120. A respective instance of ridge 120 may be present on one or more surfaces of seat 104, and may be configured to interface with a corresponding retaining feature, e.g., retaining feature 94 described above with respect to FIG. 3. For example, seat 104 may click into place with retaining feature 94 grabbing onto ridge 120 to hold the crossbar seat block in place on the coupler. Holding the crossbar seat in place may be temporary, as the crossbar seat is secured in place by subsequent clamping of the crossbar.

Crossbar seat 104 is supported on the coupler. Accordingly, a lower mating surface 122 may be shaped to engage or otherwise fit onto a corresponding support surface of the coupler (e.g., support surface 90 described above with respect to FIG. 3). As described below regarding similar crossbar seats, lower mating surface 122 may include one or more additional features, such as discrete positioning teeth, a selected curvature, etc.

Figure 5:
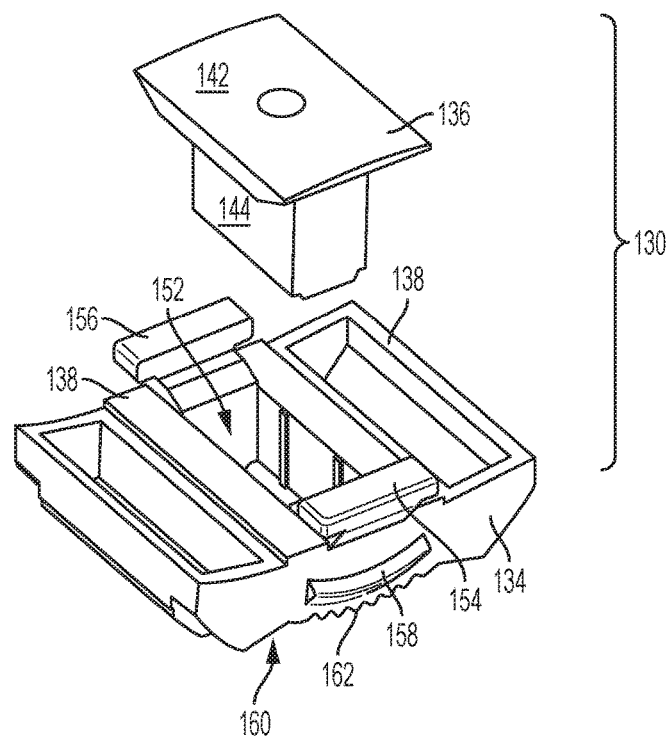
FIG. 5 is an isometric exploded view of another illustrative crossbar clamp suitable for slotted crossbars.
Figure 6:
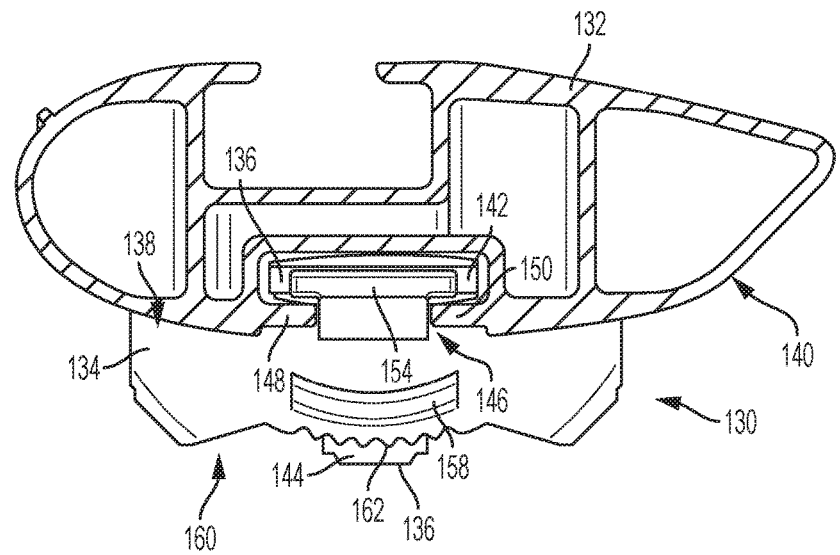
FIG. 6 is an end elevation view of the crossbar clamp of FIG. 5 assembled and installed in an illustrative slotted crossbar.

FIGS. 5 and 6 depict another illustrative clamp 130 suitable for use with a slotted crossbar 132. FIG. 5 is an exploded isometric view of clamp 130, and FIG. 6 is an end view of clamp 130 assembled and inserted into a longitudinal bottom slot of crossbar 132, which is shown in section view.

Clamp 130 includes a crossbar seat 134 and a crossbar connector 136. Similar to crossbar seat 104, crossbar seat 134 may include any suitable structure configured to cradle crossbar 132 on a seating surface 138 that generally conforms to an outer surface 140 of the crossbar. Crossbar seat 134 may be described as an anvil or a fixed jaw. In some examples, seating surface 138 may include a resilient, compressible, and/or compliant layer, such as a rubber coating, to reduce damage to crossbar 132.

Crossbar connector 136 may include any suitable structure configured to capture (e.g., grasp or grip) crossbar 132, and to be movable relative to crossbar seat 134, such that the captured crossbar can be urged against seating surface 138. Crossbar connector 136 may be interchangeably referred to as a crossbar capturing member or crossbar capturing portion of clamp 130. In this example, crossbar connector 136 may be referred to as a tee or a mushroom.

Crossbar connector 136 includes a flange portion 142, also referred to as a cap or tee portion, and a stem portion 144. Flange portion 142 is a substantially planar plate or flange sized to slide into a tee slot 146 (also referred to as a T-slot) of slotted crossbar 132. Tee slot 146 runs longitudinally along a length of crossbar 132, and comprises a pair of spaced apart lips 148 and 150 defining a gap (i.e., slot 146) therebetween. Flange portion 142 has a width that spans slot 146, such that bottom surfaces of the flange portion may abut upper surfaces of lips 148 and 150 of the tee slot. Stem portion 144 extends or protrudes orthogonally from flange portion 142. Stem portion 144 may be sized such that stem portion 144 can extend through slot 146 when flange portion 142 is inserted in the slot, as shown in FIG. 5. Accordingly, crossbar connector 136 may freely slide in a longitudinal direction along slot 146 of crossbar 132 when clamp 130 is unclamped.

Stem portion 144 may include a fastening mechanism, such as a threaded hole, for attaching connector 136 to a clamp actuator. Similar to the way sliding sleeve portion 112 onto crossbar 102 captured that crossbar, inserting crossbar connector 136 into tee slot 146 effectively captures crossbar 132.

Crossbar seat 134 includes a block having an aperture 152 running vertically through the block, and through which crossbar connector 136 can at least partially extend. For example, stem portion 144 may extend through aperture 152, as shown in FIG. 6. In some examples, stem portion 144 may be connectible to an actuator, such that the actuator can pull crossbar connector 136 downward through aperture 152. As can be seen in FIG. 6, this action will cause flange 142 to exert force on lips 148 and 150, pulling crossbar 132 down onto crossbar seat 134, thereby arresting the downward motion of the crossbar connector and clamping the crossbar in place. (See FIGS. 13-14).

Crossbar seat 134 may include a pair of guide flanges 154 and 156 protruding from seating surface 138 on opposing sides of aperture 152. Guide flanges 154 and 156 may include any suitable structures axially aligned with each other and configured to mate in sliding engagement with crossbar slot 146. As with flange portion 142 of crossbar connector 136, guide flanges 154 and 156 may be passed into slot 146 through an end of the crossbar, in an axial direction with respect to the long axis of the crossbar. Guide flanges 154 and 156 are positioned on either end of flange portion 142 of the bar connector when assembled. Guide flanges 154 and 156 may be unitary with crossbar seat 134.

The guide flanges may function to maintain an orientation of the crossbar seat with respect to the crossbar slot and/or to keep seat 134 adjacent to the crossbar, e.g., during assembly and adjustment. Guide flanges 154 and 156 may not be load bearing structures. For example, clamping force may be applied to crossbar 132 by drawing bar connector 136 down onto crossbar seat 134. Flanges 154 and 156 are fixed relative to crossbar seat 134. Consequently, the guide flanges may not exert any substantive vertical force on the crossbar during a clamping operation.

Crossbar seat 134 also includes a retention ridge 158, substantially similar to ridge 120 described above. As with crossbar seat 104, a lower mating surface 160 may be shaped to engage or otherwise fit onto a corresponding support surface of the coupler (e.g., support surface 90 described above with respect to FIG. 3). Lower mating surface 160 may include one or more additional features, such as discrete positioning teeth 162 configured to mate with corresponding teeth or features on the support surface of the coupler.

Figure 7:
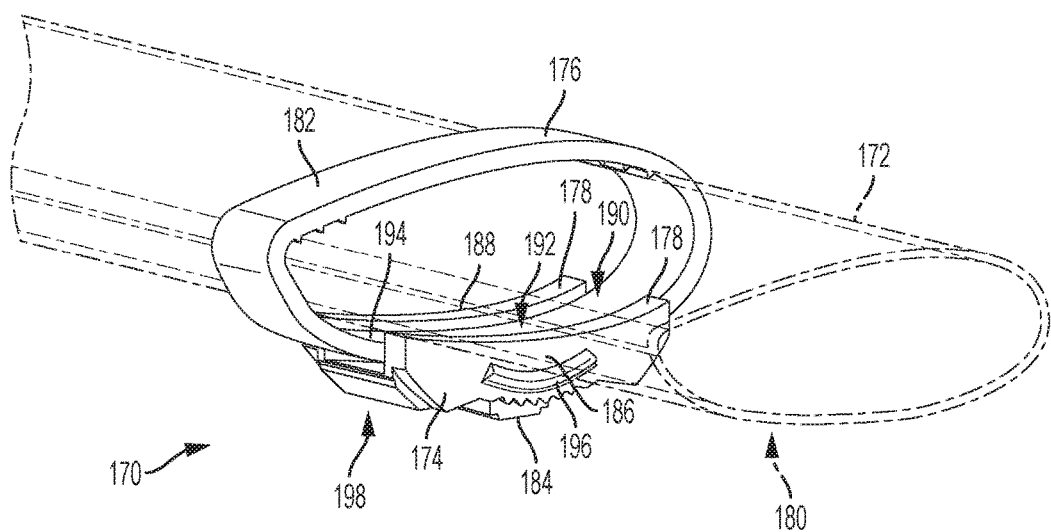
FIG. 7 is an isometric view of another illustrative crossbar clamp suitable for aerodynamically shaped crossbars.

FIG. 7 depicts another illustrative clamp 170 suitable for use with an aerodynamic (also referred to as "aero") or teardrop shaped crossbar 172. Aero crossbar 172 may or may not include a lower T-slot, similar to crossbar 132. However, crossbars having lower T-slots frequently also have such slots on upper surfaces, and clamp 170 may interfere with these upper slots. Accordingly, it may be desirable to use clamp 130 rather than clamp 170 in some examples, and vice versa.

Clamp 170 includes a crossbar seat 174 and a crossbar connector 176, both of which are similar to their corresponding components in clamp 100. Crossbar seat 174 may include any suitable structure configured to cradle crossbar 172 on a seating surface 178 that generally conforms to an outer surface 180 of the crossbar. Crossbar seat 174 may be described as an anvil or a fixed jaw. In some examples, seating surface 178 may include a resilient, compressible, and/or compliant layer, such as a rubber coating, to reduce damage to crossbar 172.

Crossbar connector 176 may include any suitable structure configured to capture (e.g., grasp or grip) crossbar 172, and to be movable relative to crossbar seat 174, such that the captured crossbar can be urged against seating surface 178. Crossbar connector 176 may be interchangeably referred to as a crossbar capturing member or crossbar capturing portion of clamp 170.

In this example, crossbar connector 176 includes a sleeve portion 182 and a stem portion 184. Sleeve portion 182 is a substantially teardrop-shaped or airfoil-shaped tube or collar generally conforming to but slightly larger than an outer shape of the aero crossbar. Sleeve portion 182 may freely slide on crossbar 172. Stem portion 184 extends or protrudes outward from an outer surface of sleeve portion 182. Stem portion 184 may include a fastening mechanism, such as a threaded hole, for attaching connector 176 to a clamp actuator.

Seating surface 178 of crossbar seat 174 may include two raised wall portions 186, 188 defining a central channel 190, and may have an aperture 192 passing vertically through the crossbar seat. Crossbar connector 176 can at least partially extend through aperture 192, and sleeve 182 may be nestable in channel 190, as shown in FIG. 7. Stem portion 184 may extend through aperture 192 when clamp 170 is assembled.

In some examples, stem portion 184 may be connectible to an actuator, such that the actuator can pull crossbar connector 176 downward through aperture 192. As can be seen in FIG. 7, this action will cause crossbar 172 to be pulled down onto crossbar seat 174, thereby arresting the downward motion of the crossbar connector and clamping the crossbar in place. As depicted in FIG. 7, a lower inner surface 194 of sleeve portion 182 may be pulled below seating surface 178. This may be facilitated by the larger diameter of sleeve portion 182 and/or an elastic deformation of sleeve portion 182 as a downward force is applied by the actuator. In some examples, crossbar 172 may be a steel crossbar and sleeve portion 182 may comprise aluminum.

Crossbar seat 174 also includes a retention ridge 196. A respective instance of ridge 196 may be present on one or more surfaces of seat 174, and may be configured to interface with a corresponding retaining feature, e.g., retaining feature 94 described above with respect to FIG. 3. For example, as with other crossbar seats, seat 174 may click into place with retaining feature 94 grabbing onto ridge 196 to hold the crossbar seat block in place on the coupler. Holding the crossbar seat in place may be temporary, as the crossbar seat is secured in place by subsequent clamping of the crossbar.

Crossbar seat 174 is supported on the coupler. Accordingly, a lower mating surface 198 may be shaped to engage or otherwise fit onto a corresponding support surface of the coupler (e.g., support surface 90 described above with respect to FIG. 3).

As described above, lower mating surface 198 may include one or more additional features, such as discrete positioning teeth, a selected curvature, etc.

Illustrative Crossbar Clamp Actuator

As shown in FIGS. 8-14, this section describes an illustrative clamp actuator (also referred to as an actuator mechanism or actuator assembly) suitable for use in a coupler to tighten crossbar clamps similar to those described above. The clamp actuator described in this section is an example of crossbar clamp actuator 28, described above, and is similar to actuator 72 shown in FIG. 3. As such, corresponding components may be labeled and/or associated with the same or similar reference numbers.

As described above, actuation of crossbar clamps such as clamps 100, 130, and 170 includes repositioning of a portion of the clamp (e.g., a clamp jaw or crossbar connector) in a substantially downward direction, e.g., along a vertical path. For example, clamp 100 is actuated by applying a downward force to (e.g., pulling downward on) stem portion 114, thereby drawing bar connector 106 down with respect to bar seat 104. Because crossbar 102 is captured by the encircling bar connector 106, crossbar 102 is pinned against bar seat 104 as a result. Similarly, clamp 130 is actuated by applying a downward force to stem portion 144, thereby drawing bar connector 136 down with respect to bar seat 134. Because crossbar 132 is captured by bar connector 136 being inserted in slot 146, crossbar 132 is pinned against bar seat 134 as a result. This downward-force style of actuation may also be true for other types of clamps.

Accordingly, in these examples, a suitable actuator should provide a downward force to the crossbar connector portion of the crossbar clamps. Furthermore, it may be advantageous for a manual actuator to be accessible from an outboard side of the coupler, such that a user may operate the actuator easily when the coupler is mounted on a vehicle. Such a crossbar clamp actuator is described below, in which manipulation of a horizontal tightening member is mechanically translated into a downward clamping action.

Figure 8:
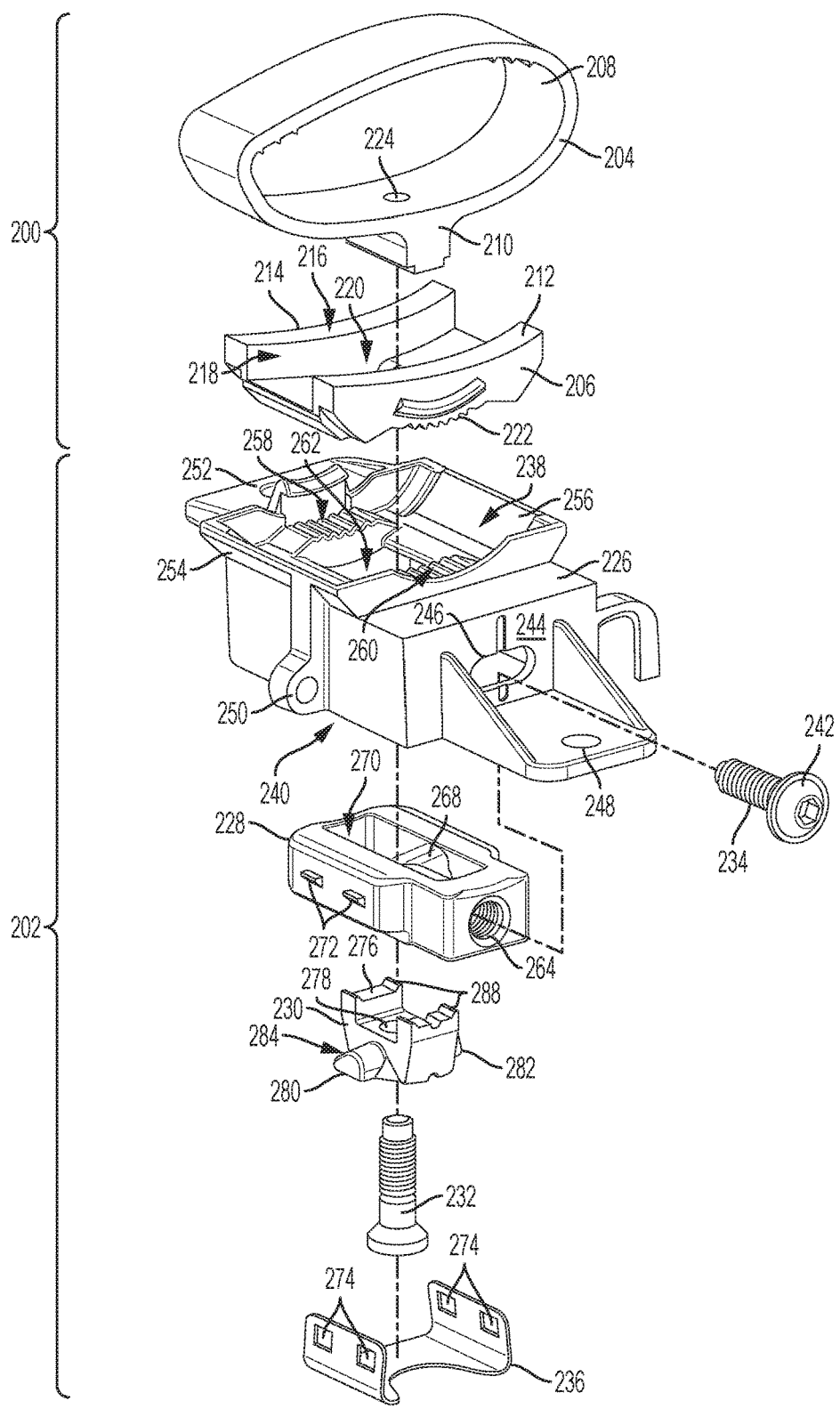
FIG. 8 is an isometric exploded view of an illustrative crossbar clamp and crossbar clamp actuator assembly in accordance with aspects of the present disclosure.

In FIG. 8, a crossbar clamp 200 and a crossbar clamp actuator 202 are depicted in an exploded view. Any suitable crossbar clamp, such as the ones described above, may be used with actuator 202. In this example, crossbar clamp 200 is substantially identical to crossbar clamp 170, and includes a crossbar connector 204 and a crossbar seat 206. Crossbar connector 204 is a collar-type connector having a sleeve portion 208 and a stem portion 210. Crossbar seat 206 includes a pair of side walls 212 and 214 defining a seating surface 216 for an aero crossbar (not pictured), a central channel 218, and an aperture 220. A rounded lower surface of the crossbar seat includes positioning teeth 222 for positively locating the crossbar seat on the housing described below.

Stem portion 210 of the crossbar connector includes a threaded hole 224 passing vertically through the stem. Stem portions of other crossbar clamps may include similar threaded holes, which may or may not pass completely through the stem. These threaded holes may be used to fasten a selected clamp to the attachment bolt of the actuator (see below), which corresponds to threaded member 90 of FIG. 3. Stem portion 210 may have a shaped lower profile. In this example, the lower profile is stepped or keyed to provide a mating surface for the wedge follower described further below.

As shown in FIG. 8, actuator 202 (also called an actuator assembly) includes a housing 226, a traveling wedge block 228 (also called a slide wedge or wedge portion), a wedge follower 230 (also called a slide follower), an attachment bolt 232 (also called a second threaded member), a tightening screw 234 (also called a first threaded member) for positioning the traveling wedge block, and a security cover 236.

Housing 226 may include any suitable structure(s) configured to provide a support surface 238 for crossbar seat 206, to define a cavity 240 for housing wedge block 228 and wedge follower 230, and to provide a stationary fulcrum or brace against which the mover of the wedge block can apply force. In this example, the mover of the wedge block is tightening screw 234. Accordingly, a head 242 of the tightening screw abuts and turns against a substantially vertical plate 244 (i.e., a wall) of housing 226, which provides a stationary structural abutment. The tightening screw passes through an hole 246 in the plate. Hole 246 may be elongated and/or arcuate, facilitating side to side adjustment within the hole and/or minor rotation/tilting of traveling wedge block 228. A washer may be disposed between head 242 and plate 244. In other examples, the mover of the traveling wedge block may include a cam mechanism, a lever, and/or the like.

In this example, housing 226 is a unitary, box-like structure having an open bottom (e.g., a five-sided box). Housing 226 includes features for attaching the housing to other components or otherwise integrating the housing into a coupler, such as by riveting, bolting, screwing, adhering, and/or the like, or any combination of these. For example, housing 226 includes mounting structures 248, 250, and 252. In some examples, housing 226 comprises separate components, attached to each other and/or to other features of the host coupler. For example, rather than an integral portion of the housing, plate 244 may comprise a separate component bolted in position to the body of the coupler (e.g., see FIG. 3).

Support surface 238, which comprises an upper portion of housing 226, may have any suitable structures configured to mate with and/or support crossbar seat 206 thereon, for example in a selected orientation. In this example, support surface 238 includes features that conform to corresponding features of the crossbar seat. For example, raised edges 254 and 256 are configured to positively locate and cradle the general shape of seat 206, and teeth 258 and 260 are configured to mate with teeth 222 to hold the crossbar seat in position. Support surface 238 further includes an aperture 262. In this example, aperture 262 in the housing is generally rectangular and corresponds positionally to aperture 220 of the crossbar seat. This positional correspondence allows, e.g., stem 210 of the crossbar connector to pass through the two aligned apertures when the components are assembled.

Figure 9:
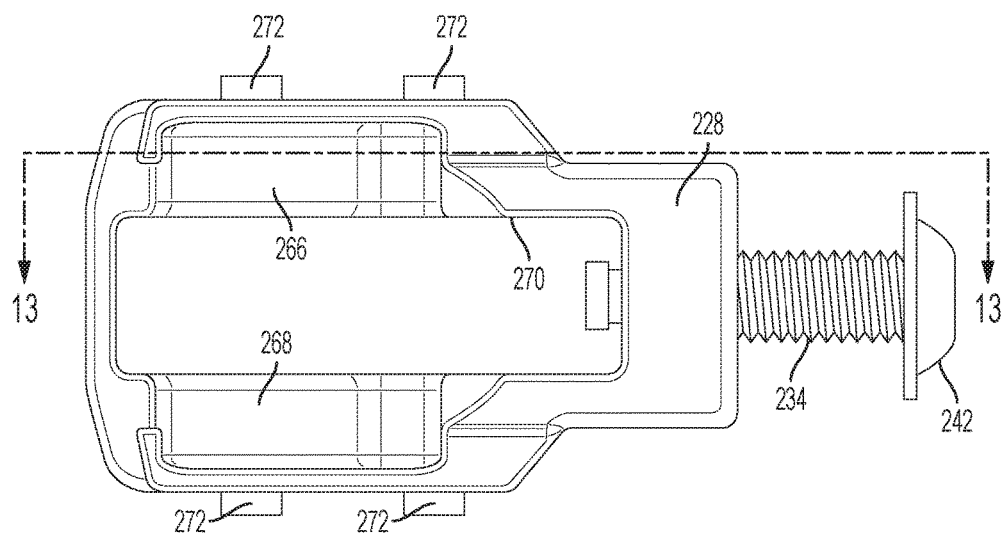
FIG. 9 is a bottom plan view of a traveling wedge block of the actuator assembly depicted in FIG. 8.

As depicted in FIGS. 8 and 9, traveling wedge block 228 is a generally rectangular block having a threaded hole 264 in an outboard end. Threaded hole 264 is configured to accept tightening screw 234, such that rotation of the tightening screw causes wedge block 228 to move horizontally toward or away from plate 244 (i.e., in an outboard or inboard direction). Wedge block 228 includes one or more ramped, downward-facing slide surfaces, in this example the wedge block includes a pair of such surfaces 266 and 268. In this example, slide surfaces 266 and 268 are generally parallel to each other, and ramp downward toward the inboard end of the wedge block. In some examples, the one or more slide surfaces may instead ramp upward toward the inboard end.

Traveling wedge block 228 is open at the bottom, such that the ramped slide surfaces are exposed. An elongate aperture 270 exists between slide surfaces 266 and 268. Aperture 270 generally aligns with apertures 220 and 262. Maintenance of this alignment during operation is facilitated by the elongated shape of aperture 270 in the wedge block's direction of travel.

Side surfaces of traveling wedge block 228 may include hooks or protrusions 272, as shown in FIGS. 8 and 9. Hooks 272 facilitate attachment of security cover 236 to wedge block 228, such that the security cover moves with the wedge block when tightening screw 234 is rotated. Security cover 236 may be clipped or otherwise coupled to the wedge block, for example by mating holes 274 of the security cover with corresponding hooks 272.

With reference now to FIGS. 8 and 10-12, wedge follower 230 is a movable component having an upper interface 276 for mating with stem 210 of crossbar connector 204. Wedge follower 230 further includes a central aperture 278 passing vertically through the wedge follower (and through which attachment screw 232 may pass), and a pair of wedge-shaped side protrusions 280, 282.

Figure 10:
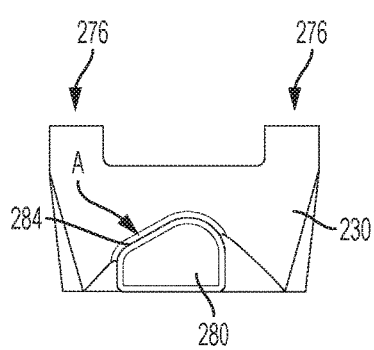
FIG. 10 is a side elevation view of a wedge follower of the actuator assembly depicted in FIG. 8.
Figure 11:
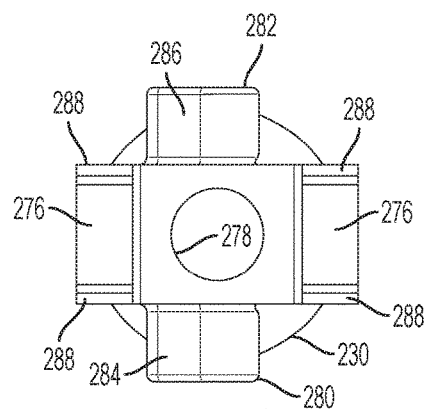
FIG. 11 is a top plan view of the wedge follower of FIG. 10.
Figure 12:
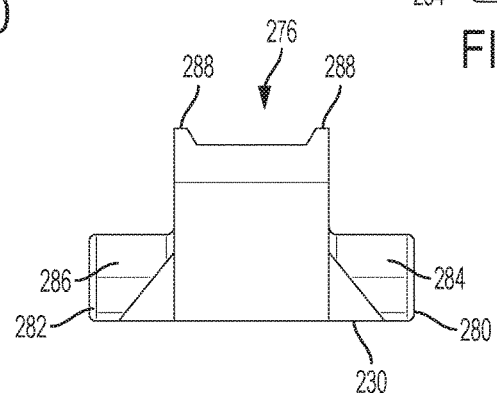
FIG. 12 is an end elevation view of the wedge follower of FIG. 10.

Side protrusions 280 and 282 each have a ramped upper slide surface 284, 286 configured to make frictional, flat-to-flat contact with a respective one of slide surfaces 266 and 268 when the wedge follower is placed into the open bottom of the traveling wedge block. Upper slide surfaces 284 and 286 may be ramped planes, such that the upper slide surfaces mate with correspondingly angled and planar slide surfaces 266 and 268 of the sliding wedge block. As indicated in FIG. 10, the ramped surface of each side protrusion may define an angle A, which may be complementary to an angle B of the correspondingly-ramped planes of surfaces 266 and 268. This flat-to-flat contact facilitates a sliding motion and opposes twisting of the wedge block and wedge follower components relative to each other when in operation.

Accordingly, horizontal repositioning of wedge block 228, e.g., in an outboard or first direction, will cause slide surfaces 266 and 268 to reposition horizontally on side protrusions 280, 282 of the wedge follower. When assembled, wedge follower 230 is substantially blocked from moving in an outboard direction but free to move in a direction orthogonal to the outboard direction (e.g., vertical). Because slide surfaces 266 and 268 are ramped, horizontal repositioning of wedge block 228 will cause a wedging action, such that the side protrusions and wedge follower 230 are urged downward (i.e., orthogonal to the first direction of the wedge block). The downward motion of wedge follower 230 may appear vertical when viewed in a direction of vehicle travel, but may be slightly off-vertical when viewed along the long axis of the crossbar. This is because the traveling wedge block may be oriented in a rotated position with respect to its long axis. Accordingly, "vertical" travel of the wedge follower may actually be normal to the plane generally defined by the width of the wedge block.

To transfer this forced downward motion to crossbar connector 204, thereby causing a clamping action, attachment bolt 232 (also referred to as an attachment screw, a retention member, a threaded member, a second threaded member) passes vertically through aperture 278 of wedge follower 230 and fastens to crossbar connector 204 via threaded hole 224 in stem 210. In some examples, aperture 278 may be threaded. In some examples, aperture 278 may be an unthreaded through-hole. Attachment screw 232 may be held in position (when not attached to the crossbar connector) by a C-clip, E-clip, or snap ring installed at the upper exit of aperture 278 (see FIG. 3). Various crossbar connector styles may be interchangeably attached to the coupler and actuator assembly using the same attachment bolt.

When wedge follower 230 is coupled to crossbar connector 204 by attachment bolt 232, the shaped bottom of stem 210 nests in the correspondingly shaped upper interface 276 of wedge follower 230. For example, upper interface 276 may include castellations 288, such that crossbar connector 204 is prevented from twisting relative to wedge follower 230 by the castellated mating surfaces. Attachment of a crossbar connector to the wedge follower is complete when the stem is seated on the wedge follower and the attachment bolt is fully tightened. In this illustrative actuator system, attachment bolt 232 is only for securing crossbar connector 204 to the assembly, and bolt 232 is not used to directly actuate the clamp.

Security cover 236 may include any suitable structure configured to prevent access to attachment bolt 232. For example, as shown in FIG. 8, security cover 236 may include a sheet of metal or other tamper-resistant material that covers the head of bolt 232 to prevent unwanted tampering. In this example, the cover is removably attachable to traveling wedge block 228 and shaped such that repositioning of the wedge block in an outboard (i.e., clamp-tightening) direction causes the security cover to block access to the bolt. Conversely, the bolt head may be uncovered when the wedge block is repositioned in a clamp-loosening direction (i.e., inboard).

Illustrative Clamp Actuation

Figure 13:
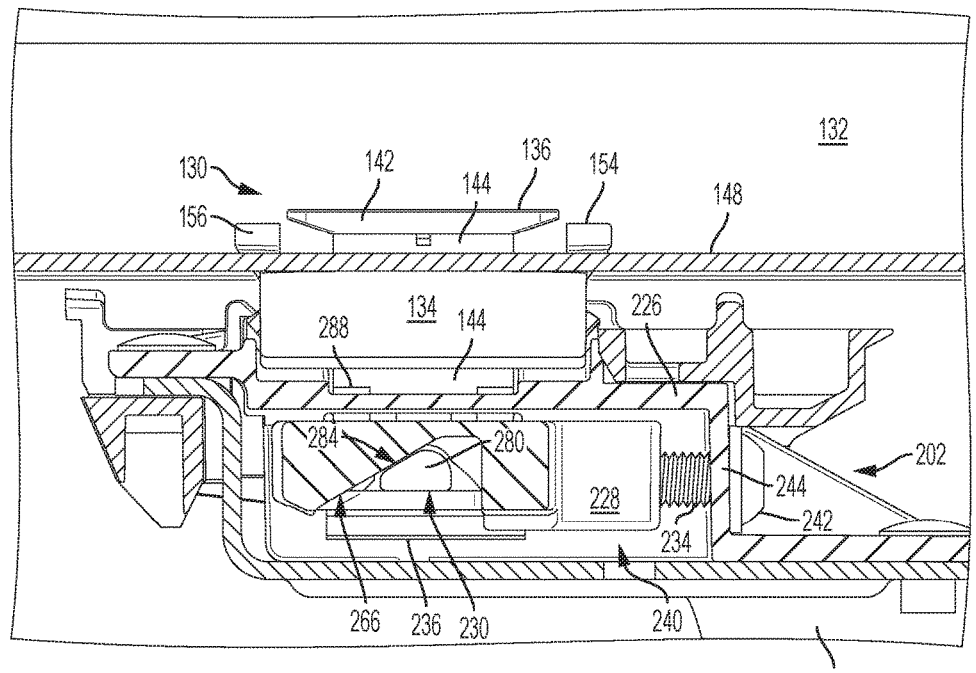
FIG. 13 is a partial, sectional, elevation view of an illustrative coupler and crossbar, showing an actuator and crossbar clamp in a first, unclamped configuration.
Figure 14:
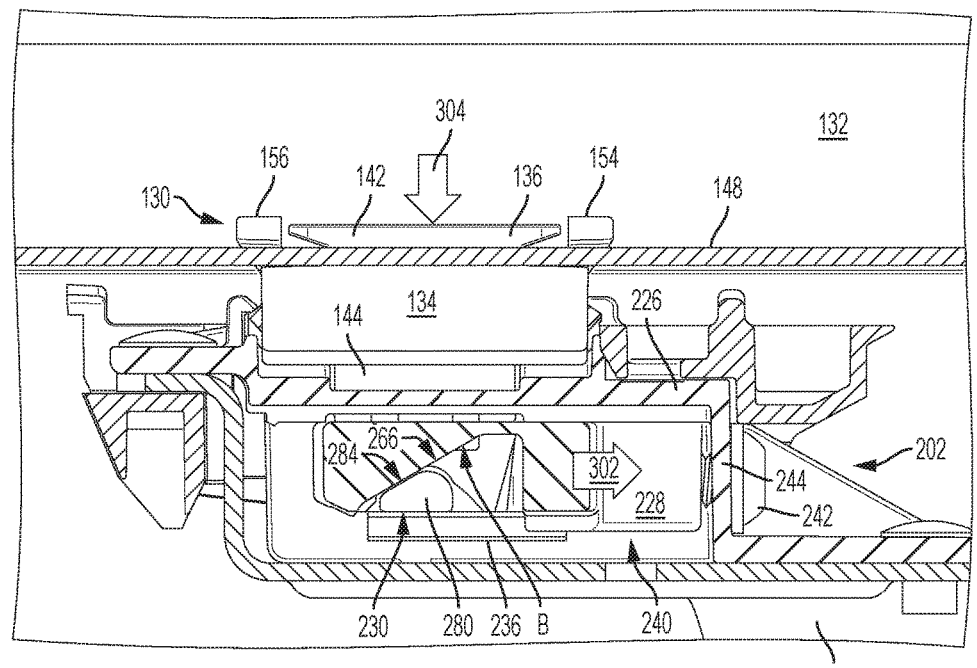
FIG. 14 is a partial, sectional, elevation view of the coupler and crossbar of FIG. 13, showing the actuator and crossbar clamp in a second, clamped configuration.

Turning now to FIGS. 13 and 14, actuator 202 is assembled, combined with clamp 130, and shown in a sectional side elevation view. Line 13-13 of FIG. 9 indicates generally where the cross section is taken with respect to traveling wedge block 228. FIG. 13 shows the actuator and clamp in a first, unclamped configuration, and FIG. 14 shows the same actuator and clamp in a second, clamped configuration.

As described above, actuator 202 may be combined with various crossbar clamps and corresponding crossbars. In this example, actuator 202 is combined with crossbar clamp 130 by bolting stem 144 of crossbar connector 136 to wedge follower 230 (using attachment bolt 232). Crossbar clamp 130 and actuator 202 are incorporated into an exemplary coupler 300, which is shown in engagement with T-slot crossbar 132.

In FIG. 13, crossbar 132 is seated on crossbar seat 134, with guide flanges 154 and 156 inserted into the crossbar slot. The crossbar is captured by flange 142 of crossbar connector 136, and stem 144 extends downward through the crossbar slot. However, flange 142 is in a raised position relative to lip 148 of the crossbar. In other words, clamp 130 is in an unclamped position, and flange 142 is not applying force to hold the crossbar against the crossbar seat.

With continuing reference to FIG. 13, stem 144 extends from flange 142 through the crossbar slot and through aperture 152 of crossbar seat 134 to mate with the castellated support surface of wedge follower 230. Wedge follower 230 is generally disposed within traveling wedge block 228, with the upper slide surfaces of the wedge follower's side protrusions in frictional contact with the slide surfaces of the traveling wedge block. For example, upper slide surface 284 is shown in contact with slide surface 266. It should be understood that upper slide surface 286 is similarly in contact with slide surface 268, but that this portion of the assembly is obscured in FIGS. 13 and 14. In the unclamped configuration shown in FIG. 13, traveling wedge block 228 is horizontally spaced from plate 244 of housing 226, and held in position by tightening screw 234.

Turning to FIG. 14, traveling wedge block 228 has been horizontally repositioned in an outboard direction (i.e., to the right in the drawing), by rotation of tightening screw 234, such that the traveling wedge block is now closer to plate 244. Rotation of screw 234 may be performed by any suitable method, such as using a driver or other tool configured to mate with screw head 242. This repositioning of wedge block 228 is generally indicated by an arrow 302.

As described above, wedge follower 230 is bolted to stem 144 of crossbar connector 136. Furthermore, the assembled wedge follower and crossbar connector are blocked from moving horizontally by the confines of the various apertures they pass through (e.g., apertures 152, 262, 270). However, the wedge follower/crossbar connector assembly does have some freedom to move up and down.

When wedge block 228 is repositioned as shown, ramped, downward-facing slide surfaces 266 and 268 are also moved in the outboard direction. This changes the effective vertical position of slide surfaces 266 and 268 at their point of interaction with the side protrusions, thereby applying a downward force on the side protrusions. Side protrusions 266 and 268 may have any suitable profile shape, and may comprise round pins or other shapes. In this example, side protrusions 266 and 268 have ramped planar surfaces that complement the ramped planar faces of surfaces 266 and 268. As described above, this feature helps to prevent twisting and other undesired moments. In some examples, this feature increases the frictional contact area between the wedge block and wedge follower, which may improve holding forces and prevent loosening of the overall mechanism.

Application of the downward force on side protrusions 266 causes wedge follower 230 and therefore the crossbar connector 136 to move along a downward path, as indicated by an arrow 304 in FIG. 14. This downward movement brings flange 142 down onto lips 148 and 150, and secures (i.e., clamps) crossbar 132 against crossbar seat 134. Accordingly, actuator 202 translates the repositioning of traveling wedge block 228 in a first direction (e.g., horizontal) into the repositioning of crossbar connector 136 in a second direction (e.g., substantially vertical), where the second direction is substantially orthogonal to the first direction. Said another way, actuator 202 translates rotational manipulation of a horizontal member (i.e., tightening screw 234) into substantially vertical tightening of a clamp portion (i.e., connector 136). It should be understood that the terms horizontal and vertical are used here in the context of the standard mounting position of the coupler. Other mutually orthogonal or otherwise transverse directions may be substituted without going beyond the scope of the present disclosure.

Illustrative Crossbar-Coupler Combinations

Figure 15:
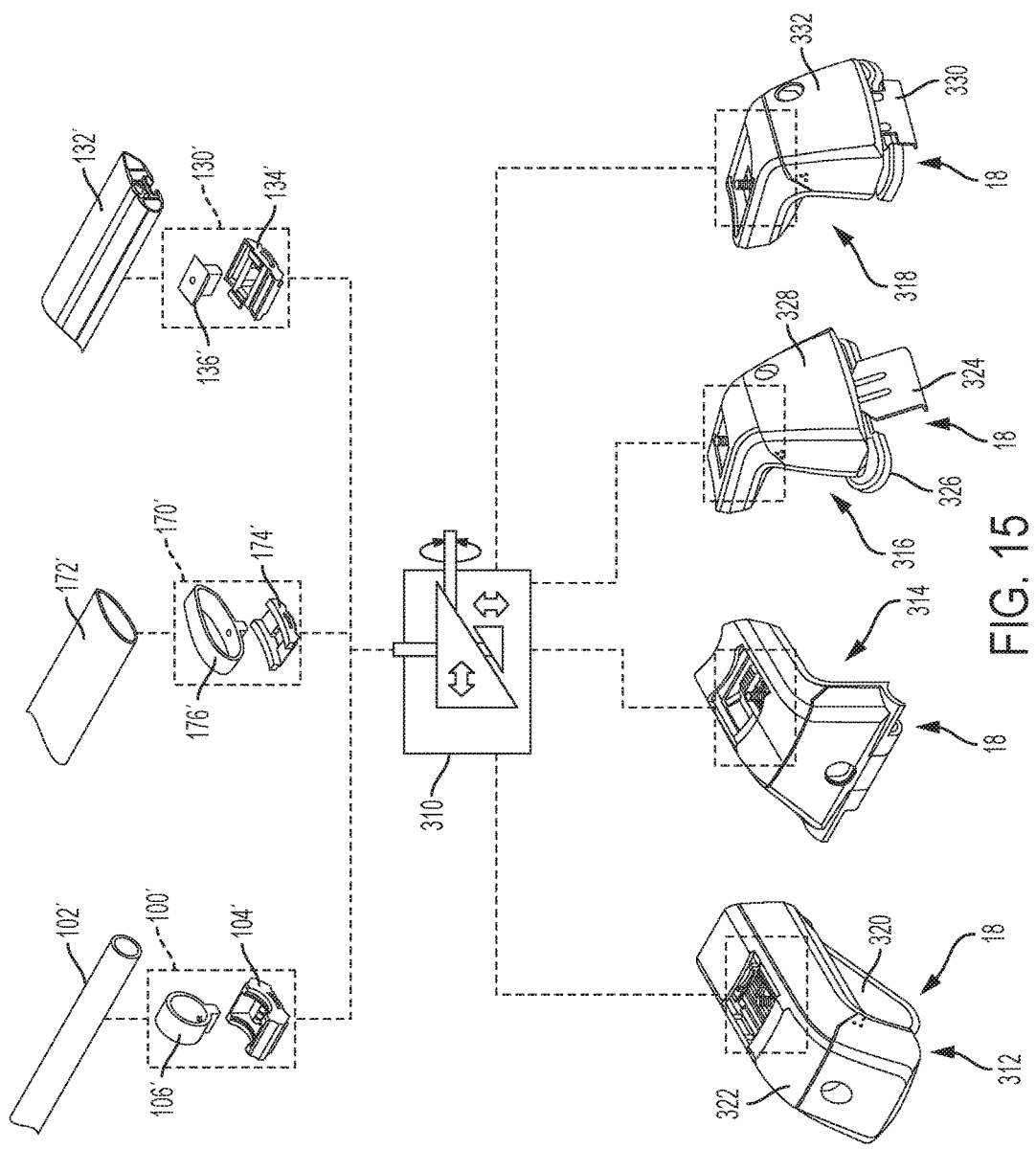
FIG. 15 is a schematic view showing various possible combinations of illustrative crossbars, clamps, and couplers with an actuator, according to the present teachings.

As shown in FIG. 15, this section describes various suitable combinations of an illustrative clamp actuator with different crossbars, crossbar clamps, and coupler styles. The clamp actuator described in this section is a schematic example of crossbar clamp actuator 28, described above. Additionally, the crossbars and crossbar clamps described in this section are examples of those described above, and have features and functions substantially identical to those already discussed. Accordingly, crossbars and clamps are labeled with primed reference numbers corresponding to the substantially identical versions above.

A clamp actuator 310 is shown schematically in FIG. 15, and represents any example of clamp actuator 28 according to the present teachings (e.g., clamp actuator 202). In this type of clamp actuator, the substantially horizontal repositioning of a traveling wedge block causes its ramped slide surface to urge a wedge follower downward, thereby actuating (e.g., closing) the clamp.

As explained above, clamp actuator 310 is versatile in a first respect, in that various different clamps can be attached to the actuator. Generally speaking, a clamp that has a vertically repositionable jaw or other element may be connected to the attachment bolt of the clamp actuator. For example, a crossbar connector (e.g., connector 106, 136, or 176) may be connected to the attachment bolt, which protrudes in a generally vertical direction from an accessible upper support surface of the coupler. This is shown graphically in FIG. 15, where crossbar clamps 100', 130', and 170' are depicted as optionally attachable to actuator 310. Crossbars 102', 132', and 172' are shown with their corresponding clamps.

Clamp actuator 310 is also versatile in a second respect, in that clamp actuator 310 may be utilized or incorporated into various couplers, such as couplers 312, 314, 316, 318 shown in FIG. 15. Although four such couplers are shown in FIG. 15 and described below, it should be understood that inclusion of actuator 310 is optional for any given coupler, and that more or fewer couplers may be available for such inclusion. In general, when clamp actuator 310 is included in a coupler, the attachment bolt protrudes generally vertically from an upper surface of the coupler, and the tightening screw protrudes in an outboard direction from the coupler. This orientation of components is illustrated, for example, in FIG. 3.

As described above with respect to couplers 16, 60, 62, 64, 66, and 70, a coupler according to the present teachings includes any suitable device configured to mount a crossbar to a vehicle feature. Accordingly, couplers 312, 314, 316, 318 each include a crossbar interface 20 comprising a selected crossbar clamp and actuator described above, as well as a vehicle interface 18 for clamping or otherwise connecting the coupler to a vehicle feature.

Specifically, coupler 312 is a strap-type coupler suitable for connecting the coupler to a raised rail feature of a vehicle. Raised rails generally include a pair of rails or bars each running parallel to the direction of vehicle travel and spaced above a respective lateral side of the rooftop. A strap 320 extends from a body 322 of this coupler, and is configured to pass under one of the raised rails while body 322 rests on top of the rail.

Coupler 314 is a fixed-point style of coupler, suitable for connecting to a base portion fixed to a vehicle rooftop. Retractable pins in vehicle interface portion 18 of coupler 314 extend into corresponding receptacles in the base (not pictured). An example of a coupler having this type of vehicle interface is described in U.S. Pat. No. 6,905,053, the entirety of which is hereby incorporated herein for all purposes.

Coupler 316 is a naked-roof style of coupler, suitable for connecting the coupler to a gutter or other slot running along a side of the vehicle rooftop. An adjustable clip 324 and rooftop seat 326 extend from a lower portion of a body 328 of coupler 316. Seat 326 sits atop the vehicle roof, while clip 324 grabs onto the vehicle gutter (or the like).

Coupler 318 is a two-clip flush rail type of coupler, similar to the couplers shown in FIG. 2. This style of coupler is suitable for connecting the coupler to a flush rail feature of a vehicle. Flush rails generally include a pair of rails or bars each running parallel to the direction of vehicle travel on respective lateral sides of the rooftop. In contrast with the raised rail, a flush rail abuts the vehicle roof such that no gap exists between the rail and the roof. A pair of clips 330 extend from a body 332 of coupler 318 to grasp the rail (see FIG. 2).

Illustrative Method

Figure 16:
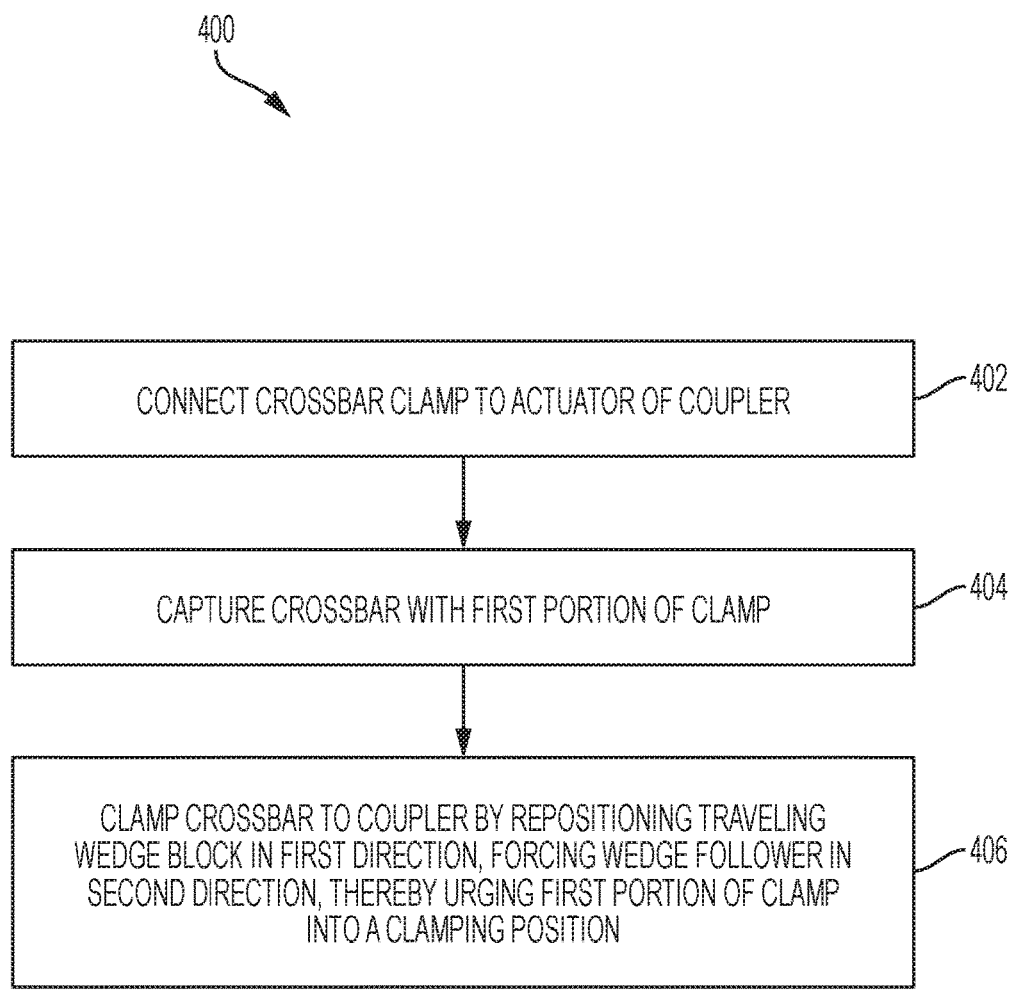
FIG. 16 is a flow chart showing steps of an illustrative method for attaching a crossbar to a vehicle.

This section describes steps of an illustrative method for attaching a crossbar to a vehicle; see FIG. 16. Aspects of crossbars, couplers, and/or actuators described above may be utilized in the method steps described below. Where appropriate, reference may be made to previously described components and systems that may be used in carrying out each step. These references are for illustration, and are not intended to limit the possible ways of carrying out any particular step of the method.

FIG. 16 is a flowchart illustrating steps performed in an illustrative method, and may not recite the complete process or all steps of the method. FIG. 16 depicts multiple steps of a method, generally indicated at 400, which may be performed in conjunction with crossbar clamping systems and devices according to aspects of the present disclosure. Although various steps of method 400 are described below and depicted in FIG. 16, the steps need not necessarily all be performed, and in some cases may be performed in a different order than the order shown.

Step 402 includes connecting a crossbar clamp (e.g., clamp 100, clamp 130, clamp 170) to a clamp actuator (e.g., actuator 202) of a coupler assembly (e.g., coupler 312, coupler 314, coupler 318, coupler 320). The clamp actuator includes a traveling wedge block (e.g., wedge block 228) operatively connected to a movable wedge follower (e.g., follower 230), such that a first portion (e.g., connector 204) of the crossbar clamp is attached to and movable with the wedge follower. In some examples, step 402 may include bolting the first portion of the crossbar clamp to the clamp actuator (e.g., using bolt 232).

In some examples, the crossbar clamp may be selected from a plurality of different crossbar clamps. For example, different crossbar clamps may be suitable for different crossbar styles. For example, crossbar clamp 100 for round crossbar 102, crossbar clamp 130 for slotted crossbar 132, and/or crossbar clamp 170 for aero bar 172.

Step 404 includes capturing a crossbar (e.g., crossbar 102, crossbar 132, crossbar 172) with the first portion of the crossbar clamp. In some examples, capturing the crossbar with the first portion of the crossbar clamp may include inserting the crossbar into a sleeve portion of the crossbar clamp (see clamps 100 and 170). In some examples, capturing the crossbar with the first portion of the crossbar clamp may include inserting a T-shaped connector of the crossbar clamp into a T-slot of the crossbar (see clamp 130 and bar 132).

Step 406 includes clamping the crossbar to the coupler assembly by repositioning the traveling wedge block in a first direction across the movable wedge follower, such that the movable wedge follower is forced in a second direction, urging the first portion of the crossbar clamp into a clamping position. The first direction is substantially parallel to a long axis of the crossbar. The second direction may be substantially orthogonal to the first direction. The second direction may be substantially downward (e.g., vertical), and the first direction may be horizontal. The first direction may be an outboard direction.

In some examples, urging the first portion of the crossbar clamp into the clamping position includes urging the first portion toward a second portion (e.g., crossbar seat 206) of the crossbar clamp.

In some examples, repositioning the traveling wedge block includes manually operating a mover of the wedge block, wherein the mover of the wedge block is accessible from a position outboard of the coupler. In some examples, repositioning the traveling wedge block includes manually rotating a threaded screw (e.g., screw 234) inserted into the traveling wedge block.

Method 400 may further include clamping a vehicle interface portion of the coupler assembly to a corresponding physical feature of a vehicle. In some examples, the physical feature of the vehicle is a rail mounted flush on a roof of the vehicle, and clamping the vehicle interface portion to the rail includes clamping the rail between opposed clips extending from the coupler. (See coupler 318). In some examples, the physical feature of the vehicle is a raised rail on a roof of the vehicle, and clamping the vehicle interface portion to the raised rail includes passing a strap of the vehicle interface portion between the raised rail and the roof. (See coupler 312).

Selected Aspects and Examples

This section describes additional aspects and features of crossbar clamp actuators and related systems and methods, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A0. A rack for carrying cargo on top of a vehicle, the rack comprising:
a crossbar and a pair of couplers configured to mount the crossbar on top of a vehicle such that a long axis of the crossbar is substantially horizontal and perpendicular to a longitudinal axis of the vehicle;
wherein each coupler includes:
a crossbar clamp having a crossbar seat and a crossbar connector movable relative to the crossbar seat; and
a crossbar clamp actuator comprising
a horizontally traveling wedge block having a ramped, downward-facing first slide surface, and
a wedge follower coupled to and movable with the crossbar connector, the wedge follower having a second slide surface in frictional contact with the first slide surface of the traveling wedge block, such that substantially horizontal repositioning of the traveling wedge block causes the ramped first slide surface to urge the wedge follower downward, moving the crossbar connector downward relative to the crossbar seat.

A1. The rack of A0, wherein the first slide surface of the traveling wedge block is a substantially planar surface.

A2. The rack of A1, wherein the second slide surface of the wedge follower is a substantially planar surface.

A3. The rack of A2, wherein the ramped first slide surface defines a first ramp angle, and the second slide surface is ramped at a second ramp angle complementary to the first ramp angle.

A4. The rack of any of paragraphs A0 through A3, wherein the actuator further includes a threaded screw passing through a housing of the actuator and inserted into an end of the traveling wedge block, such that rotation of the threaded screw is configured to cause the horizontal repositioning of the traveling wedge block.

A5. The rack of any of paragraphs A0 through A4, wherein each coupler further includes a vehicle interface configured to releasably secure the coupler to a corresponding feature of the vehicle.

A6. The rack of A5, wherein the vehicle interface includes a strap that passes between a raised rail of the vehicle and the top of the vehicle.

A7. The rack of A5, wherein the vehicle interface includes at least one clip configured to grasp the feature of the vehicle.

A8. The rack of A7, wherein the feature of the vehicle is a flush rail.

A9. The rack of any of paragraphs A0 through A8, wherein the crossbar connector includes a sleeve shaped to slide onto and generally conform to an outer shape of the crossbar.

A10. The rack of any of paragraphs A0 through A9, wherein the crossbar connector includes a flange configured to slide into a slot of the crossbar, such that the flange spans a pair of opposing lips of the slot.

A11. The rack of any of paragraphs A0 through A10, wherein the traveling wedge block is horizontally repositionable parallel to the long axis of the crossbar.

B0. A coupler for mounting a cargo rack to a vehicle, the coupler comprising:
a coupler having a vehicle interface clamp configured to releasably secure the coupler to a vehicle feature, and a crossbar clamp actuator including a traveling wedge block having a ramped first slide surface, and a movable wedge follower having a second slide surface in frictional contact with the first slide surface of the traveling wedge block; and a crossbar clamp having a first clamping portion operatively connected to and movable with the wedge follower and a second clamping portion fixed relative to the coupler;

wherein repositioning of the traveling wedge block along a first path causes the ramped first slide surface to urge the wedge follower along a second path substantially orthogonal to the first path, such that the first clamping portion moves closer to the second clamping portion.

B1. The coupler of B0, wherein the first path is horizontal.

B2. The coupler of B1, wherein the first path is in an outboard direction when the coupler is mounted on a vehicle.

B3. The coupler of any of paragraphs B0 through B2, wherein the vehicle feature includes a raised rail, and the vehicle interface clamp includes a strap passable between the raised rail and the vehicle.

B4. The coupler of any of paragraphs B0 through B3, wherein the vehicle interface clamp includes at least one clip configured to grasp the vehicle feature.

B5. The coupler of any of paragraphs B0 through B4, wherein the ramped first slide surface defines a first angle, and the second slide surface is ramped at a second angle complementary to the first angle.

B6. The coupler of B5, wherein the second slide surface and the first slide surface are planar.

B7. The coupler of any of paragraphs B0 through B6, wherein the first clamping portion is bolted to the wedge follower.

B8. The coupler of any of paragraphs B0 through B7, wherein the second clamping portion includes a seating surface configured to support a crossbar.

B9. The coupler of any of paragraphs B0 through B8, the crossbar clamp actuator further including a threaded screw passing through a structural plate and into an end of the traveling wedge block, such that rotation of the screw causes repositioning of the traveling wedge block along the first path.

C0. A method for attaching a crossbar to a vehicle, the method comprising:

connecting a crossbar clamp to a clamp actuator of a coupler assembly, the clamp actuator having a traveling wedge block operatively connected to a movable wedge follower, such that a first portion of the crossbar clamp is attached to and movable with the wedge follower;

capturing a crossbar with the first portion of the crossbar clamp; and clamping the crossbar to the coupler assembly by repositioning the traveling wedge block in a first direction across the movable wedge follower, such that the movable wedge follower is forced in a second direction, urging the first portion of the crossbar clamp into a clamping position;

wherein the first direction is substantially parallel to a long axis of the crossbar.

C1. The method of C0, wherein the second direction is substantially orthogonal to the first direction.

C2. The method of any of paragraphs C0 through C1, wherein urging the first portion of the crossbar clamp into the clamping position includes urging the first portion toward a second portion of the crossbar clamp.

C3. The method of any of paragraphs C0 through C2, wherein capturing the crossbar with the first portion of the crossbar clamp includes inserting the crossbar into a sleeve portion of the crossbar clamp.

C4. The method of any of paragraphs C0 through C3, wherein capturing the crossbar with the first portion of the crossbar clamp includes inserting a T-shaped connector of the crossbar clamp into a T-slot of the crossbar.

C5. The method of any of paragraphs C0 through C4, further including clamping a vehicle interface portion of the coupler assembly to a corresponding physical feature of a vehicle.

C6. The method of C5, wherein the physical feature of the vehicle is a rail mounted flush on a roof of the vehicle, and clamping the vehicle interface portion to the rail includes clamping the rail between opposed clips extending from the coupler.

C7. The method of C5, wherein the physical feature of the vehicle is a raised rail on a roof of the vehicle, and clamping the vehicle interface portion to the raised rail includes passing a strap of the vehicle interface portion between the raised rail and the roof.

C8. The method of any of paragraphs C0 through C7, further including selecting the crossbar clamp from a plurality of different crossbar clamps.

C9. The method of any of paragraphs C0 through C8, wherein connecting the crossbar clamp to the clamp actuator includes bolting the first portion of the crossbar clamp to the clamp actuator.

C10. The method of any of paragraphs C0 through C9, wherein repositioning the traveling wedge block includes manually operating a mover of the wedge block, wherein the mover of the wedge block is accessible from a position outboard of the coupler.

C11. The method of any of paragraphs C0 through C10, wherein repositioning the traveling wedge block includes manually rotating a threaded screw inserted into the traveling wedge block.

Advantages, Features, Benefits

The different embodiments and examples of the crossbar clamp actuator and related systems and methods described herein provide several advantages over known solutions for mounting crossbars on vehicles. For example, illustrative embodiments and examples described herein facilitate the use of interchangeable crossbar clamps on the same coupler.

Additionally, and among other benefits, illustrative embodiments and examples described herein provide increased frictional holding power and resistance to loosening, because of the flat-to-flat contact between the slide surfaces of the sliding wedge block and the wedge follower.

Additionally, and among other benefits, illustrative embodiments and examples described herein facilitate force magnification when tightening the crossbar clamp using the crossbar clamp actuator, because the complementary angles of the ramped wedge and wedge follower surfaces may be selected such that the downward force on the wedge follower is amplified relative to the force of the tightening screw. For example, a shallow angle may provide such force amplification, although a trade-off exists with respect to the amount of horizontal space required to produce sufficient downward movement of the wedge follower.

Additionally, and among other benefits, illustrative embodiments and examples described herein may substantially align the clamp tightening member (e.g., screw) parallel to a pitch axis of the crossbar, and the pitch of the crossbar may be locked in place simultaneously with clamping of the crossbar. This parallel arrangement greatly reduces the displacement of the tightening member as the crossbar is rocked on its pitch axis. The position of the clamp tightening member also provide easy access from an outboard position relative to the vehicle.

No other known system or device can perform all of these functions. However, not all embodiments and examples described herein provide the same advantages or the same degree of advantage.

Conclusion

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the invention(s) includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A rack for carrying cargo on top of a vehicle, the rack comprising:
    a crossbar and a pair of couplers configured to mount the crossbar on top of a vehicle such that a long axis of the crossbar is perpendicular to a longitudinal axis of the vehicle;
    wherein each coupler includes:
        a crossbar clamp having a crossbar seat and a crossbar connector movable relative to the crossbar seat; and
        a crossbar clamp actuator comprising
            a horizontally traveling wedge block having a ramped, downward-facing first slide surface, and
            a wedge follower coupled to and movable with the crossbar connector, the wedge follower having a second slide surface in frictional contact with the first slide surface of the traveling wedge block, such that horizontal repositioning of the traveling wedge block causes the ramped first slide surface to urge the wedge follower downward, moving the crossbar connector downward relative to the crossbar seat.

2. The rack of claim 1, wherein the first slide surface of the traveling wedge block is a planar surface.

3. The rack of claim 2, wherein the ramped first slide surface defines a first ramp angle, and the second slide surface is ramped at a second ramp angle complementary to the first ramp angle.

4. The rack of claim 1, wherein the actuator further includes a threaded screw passing through a housing of the actuator and inserted into an end of the traveling wedge block, such that rotation of the threaded screw is configured to cause the horizontal repositioning of the traveling wedge block.

5. The rack of claim 1, wherein each coupler further includes a vehicle interface configured to releasably secure the coupler to a corresponding feature of the vehicle.

6. The rack of claim 5, wherein the vehicle interface includes at least one clip configured to grasp the feature of the vehicle.

7. The rack of claim 1, wherein the crossbar connector includes a sleeve shaped to slide onto and generally conform to an outer shape of the crossbar.

8. The rack of claim 1, wherein the crossbar connector includes a flange configured to slide into a slot of the crossbar, such that the flange spans a pair of opposing lips of the slot.

9. The rack of claim 1, wherein the traveling wedge block is horizontally repositionable parallel to the long axis of the crossbar.

10. A coupling device for mounting a cargo rack to a vehicle, the coupling device comprising:
    a coupler having a vehicle interface clamp configured to releasably secure the coupler to a vehicle feature, and a crossbar clamp actuator including a traveling wedge block having a ramped first slide surface, and a movable wedge follower having a second slide surface in frictional contact with the first slide surface of the traveling wedge block; and
    a crossbar clamp having a first clamping portion operatively connected to and movable with the wedge follower and a second clamping portion fixed relative to the coupler;
    wherein repositioning of the traveling wedge block along a first path causes the ramped first slide surface to urge the wedge follower along a second path orthogonal to the first path, such that the first clamping portion moves closer to the second clamping portion.

11. The coupling device of claim 10, wherein the first path is in a horizontal, outboard direction when the coupler is mounted on a vehicle.

12. The coupling device of claim 10, wherein the ramped first slide surface defines a first angle, and the second slide surface is ramped at a second angle complementary to the first angle.

13. The coupling device of claim 12, wherein the second slide surface and the first slide surface are planar.

14. The coupling device of claim 10, the crossbar clamp actuator further including a threaded screw passing through a structural plate and into an end of the traveling wedge block, such that rotation of the screw causes repositioning of the traveling wedge block along the first path.

15. A method for attaching a crossbar to a vehicle, the method comprising:
    connecting a crossbar clamp to a clamp actuator of a coupler assembly, the clamp actuator having a traveling wedge block operatively connected to a movable wedge follower, such that a first portion of the crossbar clamp is attached to and movable with the wedge follower;
    capturing a crossbar with the first portion of the crossbar clamp; and
    clamping the crossbar to the coupler assembly by repositioning the traveling wedge block in a first direction across the movable wedge follower, such that the movable wedge follower is forced in a second direction, urging the first portion of the crossbar clamp into a clamping position;
    wherein the first direction is parallel to a long axis of the crossbar.

16. The method of claim 15, wherein the second direction is orthogonal to the first direction.

17. The method of claim 15, wherein urging the first portion of the crossbar clamp into the clamping position includes urging the first portion toward a second portion of the crossbar clamp.

18. The method of claim 15, wherein capturing the crossbar with the first portion of the crossbar clamp includes inserting the crossbar into a sleeve portion of the crossbar clamp.

19. The method of claim 15, further including selecting the crossbar clamp from a plurality of different crossbar clamps.

20. The method of claim 15, wherein connecting the crossbar clamp to the clamp actuator includes bolting the first portion of the crossbar clamp to the clamp actuator.

* * * * *